(12) United States Patent
Ishigami

(10) Patent No.: US 8,812,505 B2
(45) Date of Patent: Aug. 19, 2014

(54) METHOD FOR RECOMMENDING BEST INFORMATION IN REAL TIME BY APPROPRIATELY OBTAINING GIST OF WEB PAGE AND USER'S PREFERENCE

(75) Inventor: Yutaka Ishigami, Tokyo (JP)

(73) Assignee: TAGGY, Inc., Tokyo (JP)

( * ) Notice: Subject to any disclaimer, the term of this patent is extended or adjusted under 35 U.S.C. 154(b) by 53 days.

(21) Appl. No.: 13/518,065

(22) PCT Filed: Dec. 24, 2010

(86) PCT No.: PCT/JP2010/007477
§ 371 (c)(1),
(2), (4) Date: Jun. 21, 2012

(87) PCT Pub. No.: WO2011/080899
PCT Pub. Date: Jul. 7, 2011

(65) Prior Publication Data
US 2012/0259859 A1    Oct. 11, 2012

(30) Foreign Application Priority Data

Dec. 31, 2009  (JP) .................................. 2009-299305
Apr. 27, 2010  (JP) .................................. 2010-102013

(51) Int. Cl.
*G06F 17/30*    (2006.01)

(52) U.S. Cl.
USPC ........................................................ 707/737

(58) Field of Classification Search
USPC ........................................................ 707/737
See application file for complete search history.

(56) References Cited

U.S. PATENT DOCUMENTS 7,725,487 B2 * 5/2010 Nadamoto et al. ............ 707/769
(Continued)

FOREIGN PATENT DOCUMENTS

JP    2003-345824 A    12/2003
(Continued)

OTHER PUBLICATIONS

Yukino Baba et al., "Folksonomy kara no Senzaiteki Chishiki Chushutsu", MYCOM2009 (Dai 10 Kai AI Wakate no Tsudoi) Yokoshu, [online], May 27, 2009, pp. 1-4, URL:http://mycom.alife.cs.is.nagoya-u.ac.jp/2009/proc/1-1-baba.pdf.

(Continued)

*Primary Examiner* — Debbie Le
(74) *Attorney, Agent, or Firm* — Posz Law Group, PLC

(57) ABSTRACT

Disclosed is an information recommendation method for providing a construction method for a classified word database capable of rapidly accommodating changes in associations between words. The disclosed information recommendation method basically is based on the finding that, by analyzing occurrence frequency information of an arbitrary word in a Web site having an arbitrary classified word in real-time and obtaining the real-time degree of similarity between the classified word and the arbitrary word, it is possible to construct a database that is capable of being sensitive in responding to changes in associations between words. The disclosed information recommendation method relates to a method of extracting classified words indicating a main idea of text included in a Web page, accumulating the classified words, and constructing a real-time tag database; an information recommendation method for using the tag database to reflect the main idea of the Web page in real-time; and an information matching method of advertisements for using the tag database to reflect the main idea of the Web page and tastes of users in real-time.

8 Claims, 17 Drawing Sheets

(56) References Cited

U.S. PATENT DOCUMENTS

| | | | |
|---|---|---|---|
| 7,996,390 B2* | 8/2011 | Freire et al. | 707/722 |
| 8,010,545 B2* | 8/2011 | Stefik et al. | 707/758 |
| 8,190,556 B2* | 5/2012 | Pappas | 707/602 |
| 2009/0307081 A1* | 12/2009 | Rabbitt et al. | 705/14.42 |
| 2010/0057577 A1* | 3/2010 | Stefik et al. | 705/14.73 |
| 2010/0057716 A1* | 3/2010 | Stefik et al. | 707/5 |

FOREIGN PATENT DOCUMENTS

| | | |
|---|---|---|
| JP | 2004-054882 A | 2/2004 |
| JP | 2008-310626 A | 12/2008 |
| JP | 2009-259248 A | 11/2009 |

OTHER PUBLICATIONS

Satoshi Nakamura et al., "Social Annotation ni Motozuku Doga Kensaku Shuho", Dai 1 Kai Forum on Data Engineering and Information Management—DEIM Forum-Ronbunshu, [online], May 9, 2009, pp. 1-8, URL: http://db-event.jpn.org/deim2009/proceedings/files/D6-1.pdf.

Shinya Kuroda et al., "Designing Blog database for searching in Blog space", DEWS2007 Ronbunshu, [online], Jun. 1, 2007 pp. 1-8, URL: http://www.ieice.org/~de/DEWS/DEWS2007/pdf/a8-2.pdf. [Concise English explanation attached].

International Search Report mailed on Jan. 25, 2011 for the corresponding International patent application No. PCT/JP2010/007477.

* cited by examiner

A web page within a website selected in Website selecting step (S101).

Image

Text

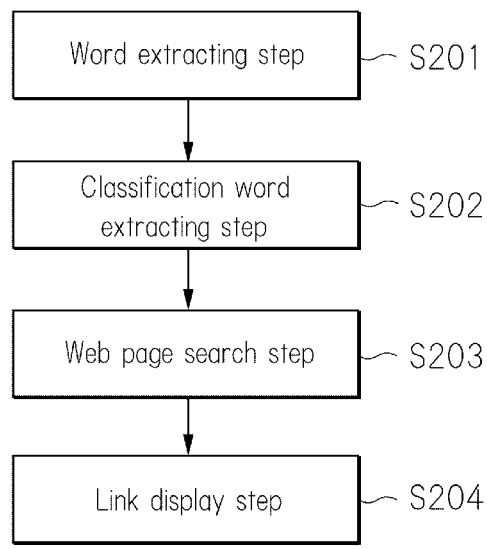
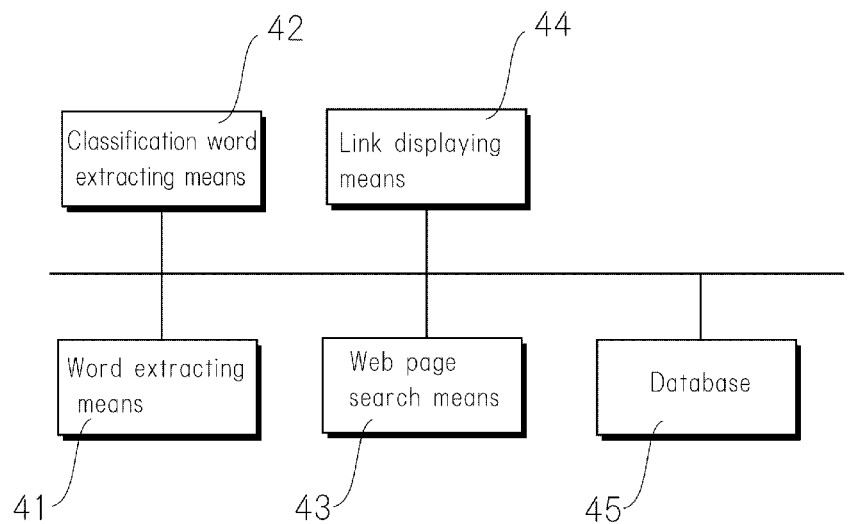

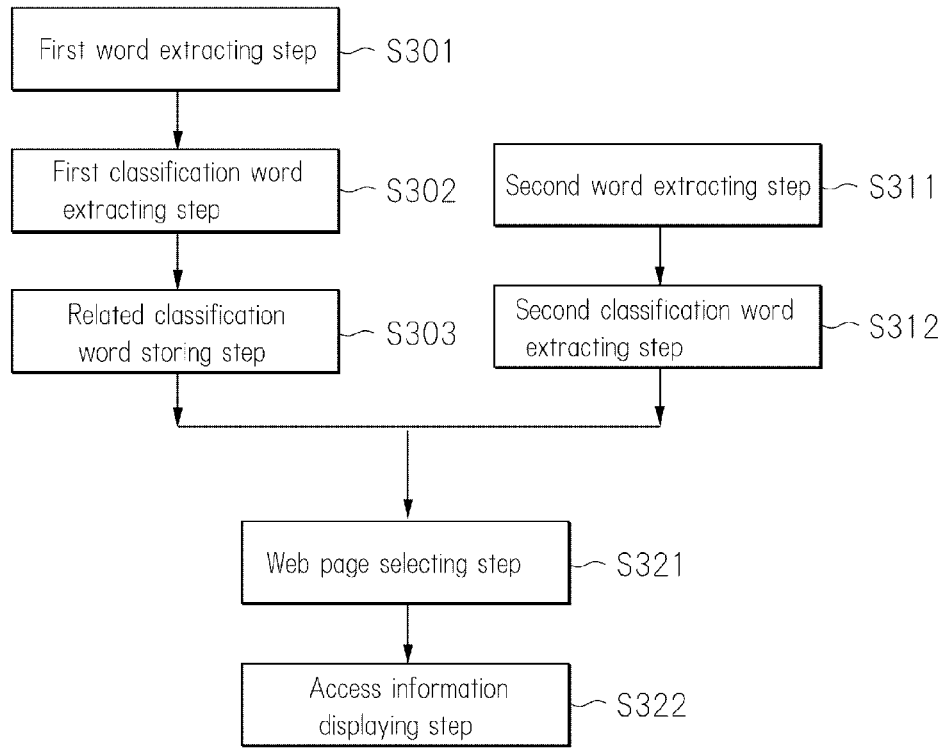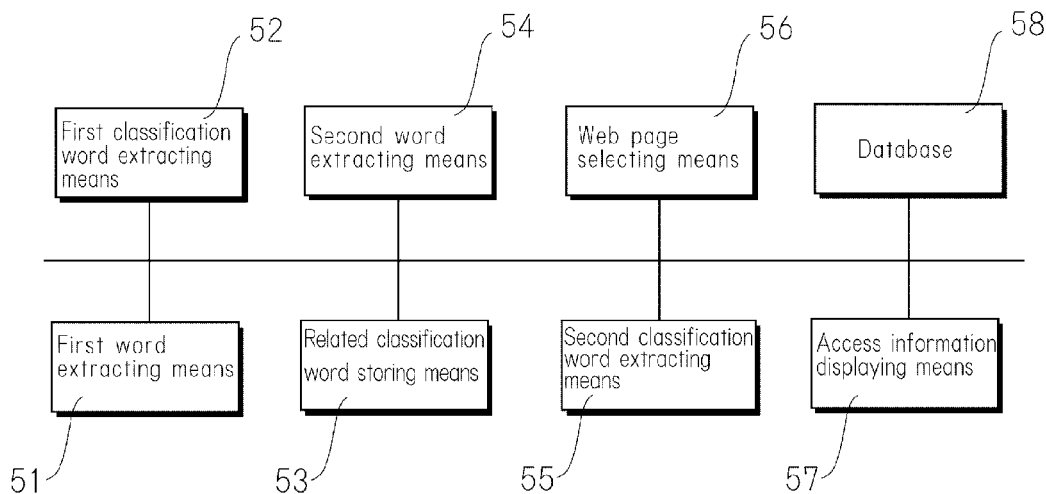

METHOD FOR RECOMMENDING BEST INFORMATION IN REAL TIME BY APPROPRIATELY OBTAINING GIST OF WEB PAGE AND USER'S PREFERENCE

TECHNICAL FIELD

The present invention relates to a method for establishing a real time tag database by extracting a classification word such as a tag which is the most suitable word representing the gist of sentences included in a web page and accumulating classification words, an information recommending method reflecting the gist of the web page in real time using the tag database, and an information matching method of an advertisement and the like that reflects, in real time, the gist of the web page and a user's preference using the tag database.

BACKGROUND ART

Japanese Patent Laid-Open No. 2009-259248 discloses a method for providing a web search service that executes tag attachment process to an image included in a web page and uses a result thereof.

Japanese Patent Laid-Open No. 2009-259248 discloses a method for attaching a tag to each web content in advance, making a given tag list, and thereafter providing web content related to a tag selected by a user.

Japanese Patent Laid-Open No. 2008-310626 discloses a method for organizing sentences made by giving tags to sentences and an automatic tag attaching device for giving tags with a high degree of accuracy. This automatic tag attaching device collects documents to which tags have already been attached, and stores the tag-attached document database. Then, for tags in the database, the degree of similarity of the tags in terms of the meaning thereof is measured on the basis of a characteristic word in a set of documents to which the tags are set, and when there are tags having the same meaning, the tags are integrated. Then, for the tags in the database, a determination is made as to whether a tag indicates a particular subject on the basis of the characteristic word. Tags are attached to an input document on the basis of the integration result of the tag integration means and the determination result of the tag importance.

CITATION LIST

Patent Literature

Patent Literature 1: Japanese Patent Application Laid-Open No. 2009-259248
Patent Literature 2: Japanese Patent Application Laid-Open No. 2008-310626

SUMMARY OF INVENTION

Technical Problem

In a conventional tag attaching method, basically, characteristic words are collected in accordance with the degree of similarity and the like defined in advance. On the other hand, a word related to a certain word changes from time to time. For this reason, in the conventional tag attaching method, a word assumed to be related to a certain word is fixed, and it is impossible to catch up with change with a high sensitivity.

Accordingly, it is an object of the present invention to provide a method for establishing a classification word database that can quickly catch up with change of relationship between words.

Further, it is an object of the present invention to provide, in real time, an information recommending method appropriately in accordance with change of a meaning of a web page and change of a word, using the above classification word database.

Further, it is an object of the present invention to provide, in real time, an information matching method of an advertisement and the like appropriately in accordance with change of a user's interest and change of a meaning of a web page, using the above classification word database.

Solution to Problem

In the present invention, first, appearance frequency information of a certain word in a web site having a certain classification word is analyzed in real time, and the degree of similarity between the classification word and the word is obtained in real time, thus establishing a database corresponding to change of relationship between the words with a high degree of sensitivity. Then, in the present invention, information about advertisements and the like with a computer is matched using the established database.

First, the present invention relates to a method for establishing a database for making, into a score, relationship between a certain classification word displayed as a tag or a category in a web site and a word group included in a web site including the classification word as a tag or a category. In this method, the database is established as follows.

The computer selects multiple web sites having a certain classification word from web sites connected to the computer via an electronic communication circuit (web site selecting step).

The computer extracts a word group included in sentences in the web sites selected in the web site selecting step (word group extracting step).

The computer measures, in the web sites selected in the web site selecting step, the frequency of each word included in the word group extracted in the word group extracting step, and performs numerical conversion on relationship between the certain classification word and each word (numeric conversion step).

The computer stores, to the database, the numerical value obtained in the numeric conversion step for each word included in the word group and each word of the word group included in the sentences of the web sites selected in the web site selecting step in relation to the certain classification word (storage step).

Subsequently, the present invention relates to an information matching method of an advertisement and the like with a computer using a database. This database is basically the database established by the method for establishing the database as explained above. More specifically, this database is a database storing multiple classification words, one or more words related to each of the multiple classification words, and a numerical value of the relationship of one or more words with the classification word in association with each other.

In this matching method, matching is made as follows. That is, first, classification words of multiple web pages are determined. The multiple web pages may be advertisement-linked web pages having advertisements as media.

This matching method is not limited to matching of information about advertisements, and can be used for matching of various kinds of information.

First, words included in each of multiple web pages are extracted (first word extracting step). Then, using the words extracted in the first word extracting step to access the database, a classification word is extracted from the database, and thereby the classification word related to each of the web pages is extracted (first classification word extracting step). Access information to each of the web pages and the classification word related to each of the web pages extracted in the first classification word extracting step are stored in association with each other (related classification word storing step).

Subsequently, the preference of a user who uses a certain client is analyzed.

Words used for search of the Internet by a certain client or words included in web pages viewed by the certain client are extracted (second word extracting step). Using the words extracted in the second word extracting step to access the database, a classification word is extracted from the database, and thereby the classification word related to each client is extracted (second classification word extracting step).

In the above circumstances, each web page and the user's preference are matched.

More specifically, the classification word extracted in the second classification word extracting step and the classification word extracted in the first classification word extracting step are used to obtain a web page having a classification word related to the classification word extracted in the second classification word extracting step (web page selecting step).

In the above circumstances, access information to the web page stored in the related classification word storing step is displayed on the client (access information displaying step).

Therefore, the preference of the user of the client that can be read from the certain client and the web page suitable for the preference (in particular, an advertisement-linked web page having an advertisement as a medium) can be matched in real time.

A tag according to a preferred mode of the present invention is text information displayed on the web page as what is representing the gist of the word group included in the sentences of the web site. Alternatively, the tag may also be called text information displayed on the web page as what is related to the word group included in the sentences of the web site. Still alternatively, the tag may also be called text information displayed, together with a link, on the web page as what is classifying the meaning of the word group included in the sentences of the web site.

The tag according to the preferred mode of the present invention is attached with link information to another web site.

The category according to the preferred mode of the present invention is text information representing a directory of a web site of a tree structure, and is displayed on a web page. The category is text information representing an index obtained by classifying the content of the web site in advance, and is displayed on the web page.

The category according to the preferred mode of the present invention is attached with link information to another web site.

The tag and the category are attached by an administrator of the web site or a poster of sentences and the like in order to briefly represent the content of the sentences of the web site. More specifically, the meanings of the words included in the sentences and the content of the sentences change as the time passes, but the tag and the category are attached by the administrator and the like of the web site so as to cope with the change of the time. Therefore, the tag and the category can be said to reflect the meanings of the sentences and the words in real time.

In a web site selecting step according to the preferred mode of the present invention, the computer extracts multiple web sites having the certain classification word on the basis of the identification tag allocated to the web site.

In the preferred mode of the present invention, a section dividing step is further provided in which the computer divides the web sites selected in the web site selecting step into multiple sections by analyzing the identification tags. Therefore, in a word group extracting step, the computer extracts a word group from sentences in a section including the certain classification word among the sentences in the sections of the web sites divided in the section dividing step.

This can prevent storing the classification word and the word having no relationship with the classification word or having a low degree of relationship in association with each other. In addition, since only particular sentences are analyzed, the speed of the processing can be improved.

In the preferred mode of the present invention, a classification word group extracting step is further provided in which the computer extracts a classification word group, i.e., a tag or a category, displayed on web sites from multiple web sites connected to the computer via an electronic communication circuit. Therefore, in the web site selecting step, multiple web sites having the certain classification word included in the classification word group extracted in the classification word group extracting step are selected from the web sites connected to the computer via the electronic communication circuit.

A second aspect of the present invention relates to an information recommending method with a computer using a database. This database is basically a database established by the method for establishing the database as explained above. More specifically, this database is a database storing multiple classification words, one or more words related to each of the multiple classification words, and a numerical value of the relationship of one or more words with the classification word in association with each other.

In this method, information is recommended as follows. Words included in a certain web page are extracted (word extracting step).

The words extracted in the word extracting step are used to access the database, and a classification word is extracted from the database (classification word extracting step).

A related web page is searched using the classification word extracted in the classification word extracting step (web page search step).

A link to the web page searched in the web page search step is displayed (link display step).

As described above, information related to the certain web page can be automatically displayed as a link. In addition, instead of searching the related web page using the words included in the certain web page, the related web page is searched using the classification word related to the certain web page, so that the meaning of the sentences in the web page can be found appropriately, and the related page reflecting the preference in real time can be effectively displayed.

Advantages Effects of Invention

Further, according to the present invention, information matching method of an advertisement and the like appropriately in accordance with change of the meaning of the web page and change of the user's interest using the classification word database can be provided in real time.

According to the present invention, the frequency of a word appearing together with a certain classification word is obtained, and relationship of a related word related to the classification word is constantly updated, so that the method for establishing the classification word database capable of quickly coping with change of the relationship between words can be provided.

In addition, according to the present invention, information recommending method in accordance with change of the meanings of words and change of the meaning of the web pages using the classification word database can be provided in real time.

BRIEF DESCRIPTION OF DRAWINGS

FIG. 6 is a flowchart for explaining an information recommending method with a computer using the database according to the present invention.

FIG. 7 is a block diagram illustrating a computer for achieving this information recommending method.

FIG. 8 is a flowchart for explaining a matching method according to the present invention.

FIG. 9 is a block diagram of a computer for achieving the matching method according to the present invention.

DESCRIPTION OF EMBODIMENTS

Embodiments of the present invention will be hereinafter explained. The present invention is not limited to the embodiments explained below. The present invention includes a scope that may be appropriately corrected within a scope obvious to a person skilled in the art on the basis of the embodiments explained below.

Figure 1:
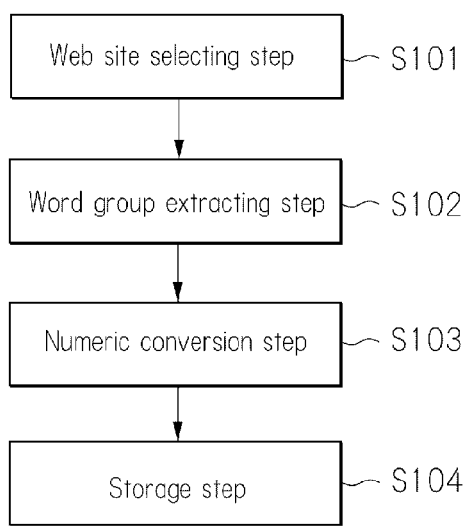
FIG. 1 is a flowchart for explaining a method for establishing a database according to the present invention.

A first aspect of the present invention relates to a method for establishing a database for making, into a score, relationship between a web site including a classification word and a word group included in a web site including the classification word. FIG. 1 is a flowchart for explaining the method for establishing the database according to the present invention. In the figure, S denotes a step. As shown in FIG. 1, the method for establishing the database according to the present invention includes a web site selecting step (step 101), a word group extracting step (step 102), a numeric conversion step (step 103), and a storage step (step 104).

Figure 20:
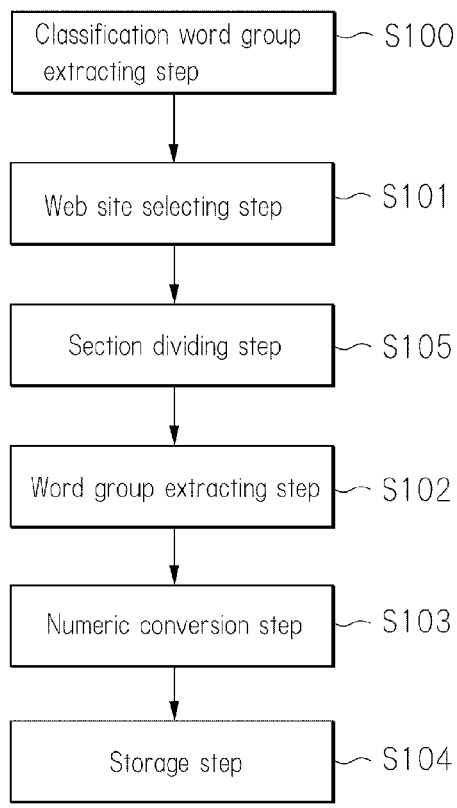
FIG. 20 is a flowchart for explaining a method for establishing a database according to the present invention further including a classification word group extracting step and a section dividing step.

As shown in FIG. 20, in the present invention, the method for establishing the database may further include a classification word group extracting step 100 and a section dividing step 105.

Figure 2:
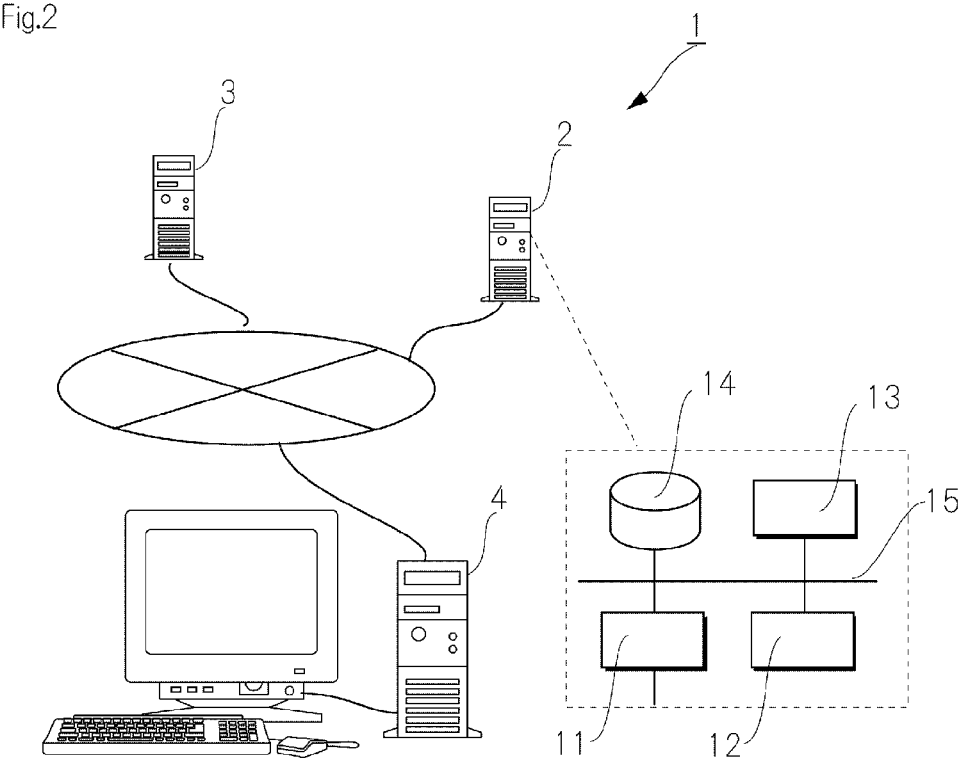
FIG. 2 is a block diagram illustrating a system for achieving a method according to the present invention.

FIG. 2 is a block diagram illustrating a system for achieving the method according to the present invention. As shown in FIG. 2, a system 1 according to the present invention includes a computer 2. The computer 2 is connected to multiple web sites 3 and clients 4 via a communication circuit such as the Internet. It should be noted that usually there are multiple web sites 3 and multiple clients 4.

In addition, the computer 2 includes an input output unit 11, a control unit 12, a calculation unit 13, and a storage unit 14, and these components are connected via a bus 15 and the like, so that information can be transmitted and received. In other words, predetermined information is input from the input output unit 11, the control unit 12 reads a control program stored in main memory of the storage unit 14. Then, the control unit 12 reads data stored in the storage unit 14 as necessary in accordance with instructions of the control program, and causes the calculation unit 13 to perform predetermined calculation. Then, the calculation result is temporarily stored to the storage unit 14, and is output from the input output unit 11.

Figure 3:
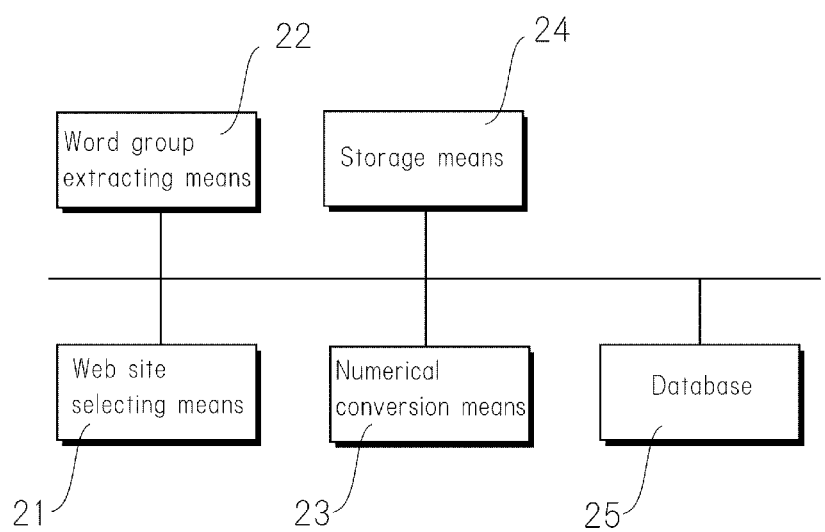
FIG. 3 is a functional block diagram illustrating a basic configuration of a computer used in the method for establishing the database according to the present invention.

FIG. 3 is a functional block diagram illustrating a basic configuration of a computer used for the method for establishing the database according to the present invention. As shown in FIG. 3, the computer 2 includes a web site selecting means 21, a word group extracting means 22, a numerical conversion means 23, a storage means 24, and a database 25.

Figure 21:
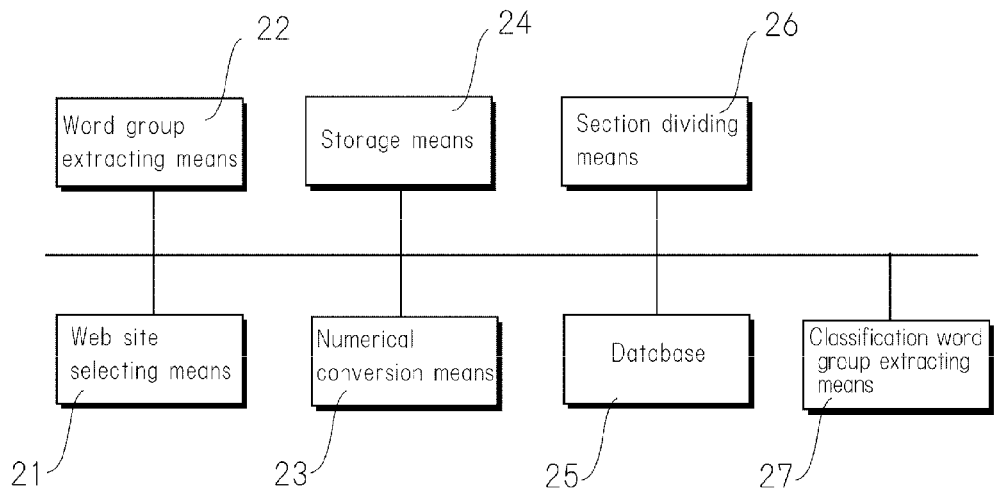
FIG. 21 is a block diagram illustrating a system for achieving a method according to the present invention further including classification word group extracting means and a section dividing step.

In addition, as shown in FIG. 21, the system according to the present invention may include a section dividing means 26 and a classification word group extracting means 27.

The web site selecting means 21 is means for selecting multiple web sites that have certain classification words as tags or categories displayed on the web sites from the computers 2 and the web sites 3 connected via an electronic communication circuit.

The computer 2 includes a database. On the other hand, the database 25 includes multiple classification words. Examples of classification words include tags and categories. The classification words may be input manually. Alternatively, the computer 2 may store URLs of multiple web sites in advance, and may select web sites using the URLs. Still alternatively, the computer 2 may automatically perform search of the Internet using the classification words stored in the database 25, find a web site including each classification word, and select multiple web sites having the classification words. The search of the Internet using a certain word is already known. Therefore, the processing for selecting multiple web sites having the classification words may be done easily using the already known method.

Figure 19:
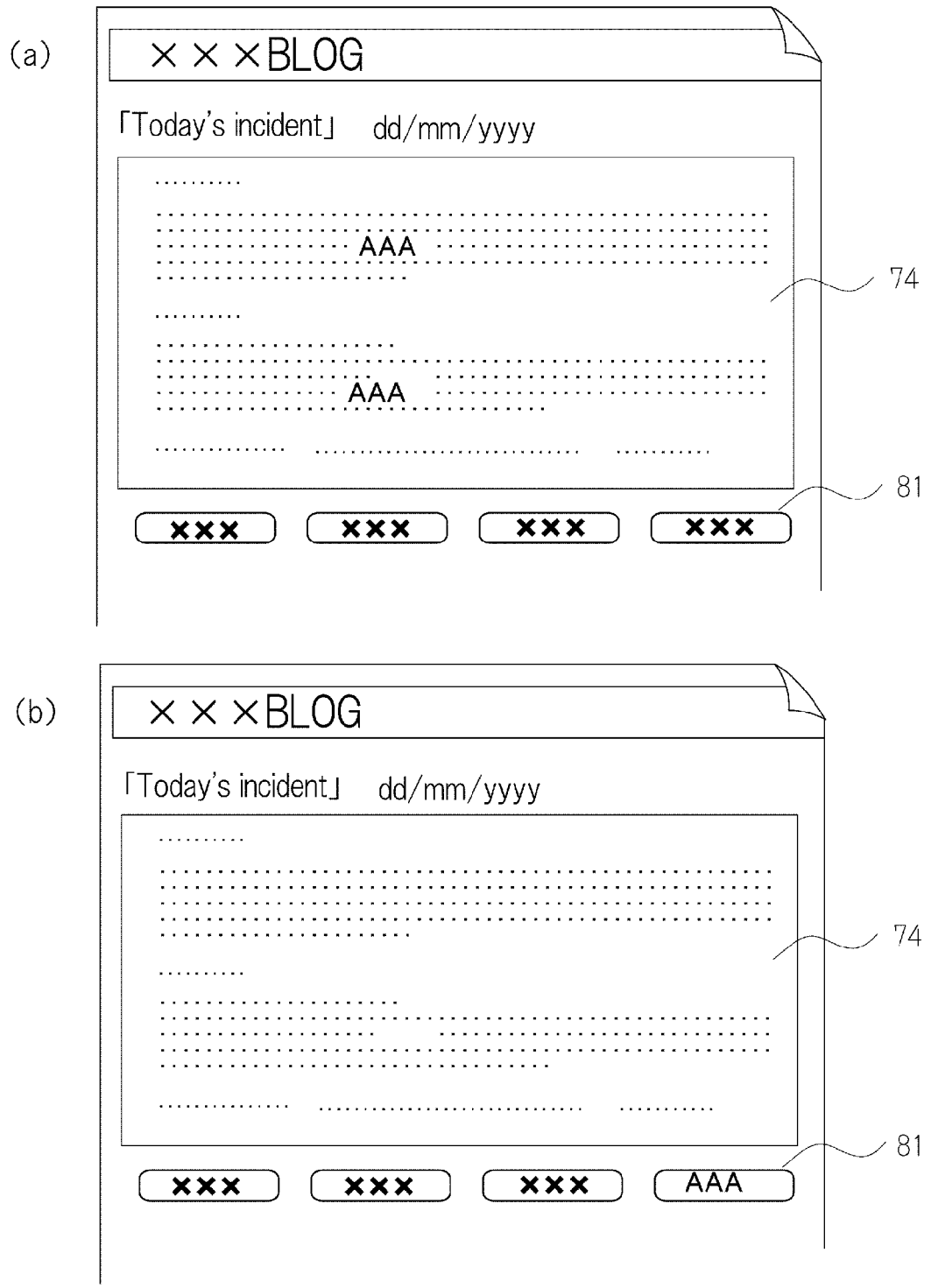
FIG. 19 is a figure for explaining a web site which is a target of selection in a web site selecting step.

Tags are displayed in a web site as one or more related keywords set in a guide article. Normally, links are pasted so that multiple web sites assigned with the same tags can be displayed. Then, when a tag is selected, it is possible to move on to a site that displays links to multiple web pages including the tag as tags. The tags may be directly input with a client of a user or an administrator who posted the article, or may be a tag automatically assigned by analyzing the article. When the search of the Internet is performed using a classification word "AAA" stored in the database 25, and a web site having the classification word "AAA" is selected, a web site having AAA only in a sentence is not selected (see FIG. 19(a)). In other words, only a web site that uses the word "AAA" as a classification word (tag or category) is selected (see FIG. 19(b)). A determination as to whether the word "AAA" is used as the classification word or not may be made by analyzing a source code constituting the web site. For example, even when the word "AAA" is included in an identification tag such as an HTML tag indicating a sentence, this is not included in a target of selection. Likewise, even when the word "AAA" exists in a section distinguished by an identification tag indicating a normal text, this means that the word "AAA" is included as the text, and therefore, this is not adopted as a target of selection. On the other hand, when the word "AAA" is included in an identification tag indicating a classification word, this web site is selected. For example, when the word "AAA" is included in the identification tag indicating that link information to another web site is attached, this is determined to be a classification word, a web site including this classification word may be selected. Alternatively, when the word "AAA" is included in the identification tag indicating change of the color and the size of the font, this is determined to be a classification word, and a web site including this classification word may be selected.

An example of classification word is a tag. The tag is a word related to a word group included in a sentence of a web site, and is displayed on a web page. The tag may be called text information displayed on a web page to indicate the gist of a word group included in a sentence in a web site. Alternatively, the tag may be called text information that is displayed on a web page to classify the meaning of a word group included in a sentence of a web site. For example, when an expression "<A Href="URL">pretty</A>" is made using an identification tag such as HTML, link information of a URL is attached to the word "pretty" and is displayed on the web page. In this case, the word "pretty" is referred to as a tag, and "<A Href="URL"></A>" is referred to as an identification tag, which are distinguished. In other words, in the present invention, the tag "pretty" is extracted.

For example, one or more tags are given, by an administrator of a web site, to an article sentence displayed on the web page as a word for classifying the meaning of the article. The tags are displayed in the same page as the article sentence. In a hosting site such as a blog site and a motion picture sharing site, one or more tags are given, by a poster himself/herself, as a word for classifying the meaning of the posted information. In this case, the tags are also displayed in the same page as the posted information. In the present invention, in a web site that does not mainly include sentences such as a motion picture sharing site, a computer can extract words from a sentence related to a classification word such as a tag in the motion picture sharing site, and can perform numerical conversion on relationship between the classification word and the word.

Another example of classification word is a category. The category is a word representing a directory of a web site having a tree structure, and is displayed on the web page. Alternatively, the category may be called text information representing an index obtained by classifying the content of the web site in advance. The category is a word representing an appropriate field or region corresponding to the article document and posted information on the web page. For example, the category may be made into hierarchy as follows: "domestic (large category)>Kanto region (medium category)>Tokyo (small category)". The category may have link information to another web page, and when the category is clicked, it may be linked to the other web page.

As described above, the computer 2 selects multiple web sites having a certain classification word from the web sites 3 connected with the computer 2 via the electronic communication circuit (step 101).

The word group extracting means 22 is means for extracting a word group included in sentences of the web sites selected by the web site selecting means.

A method for extracting a word group from web sites is already known. In the present invention, the word group may be extracted using the already known method. An example of method for extracting a word group includes a method in which a computer has a word database (corpus) storing multiple words in advance. A preferable example of word database includes a noun database. Then, a text may be extracted from a web site, and words included in the text may be extracted. The web site is usually attached with identification tags such as HTML tags, and therefore, the text can be easily read by analyzing the identification tags.

In this way, the computer 2 extracts the word group related to the certain classification word included in the sentences of the web sites selected in the web site selecting step (step 102).

The numerical conversion means 23 is means for measuring, in the web sites selected by the web site selecting means, the frequency of each word included in the word group extracted by the word group extracting means, and performing numerical conversion of relationship between the certain classification word and the word.

In other words, a word included in a web page in which the certain classification word appears may be related with the classification word with a high degree of possibility. In particular, when there is a word that is always included in a web page in which the certain classification word appears, the word would also be included in a web page in which the classification word appears with a high degree of possibility in the near future. In this manner, by obtaining the frequency of each word in each web site, the relationship between the certain classification word and the word can be converted into a numerical value.

Moreover, the web page is usually attached with identification tags such as HTML tags, and therefore, this may be analyzed by the computer 2 to divide the web page into portions in which the identification tags are included, so that a word group in the portion including the classification word is extracted, and the frequency of a word in the portion is obtained. In this manner, by classifying co-occurrence relationship by classifying the web page into portions, a related word can be extracted efficiently and appropriately.

The section dividing step (step 105) as described above in which identification tags such as HTML are analyzed and the web page is divided into multiple portions is executed by the section dividing means 26 of the computer 2.

Figure 4:
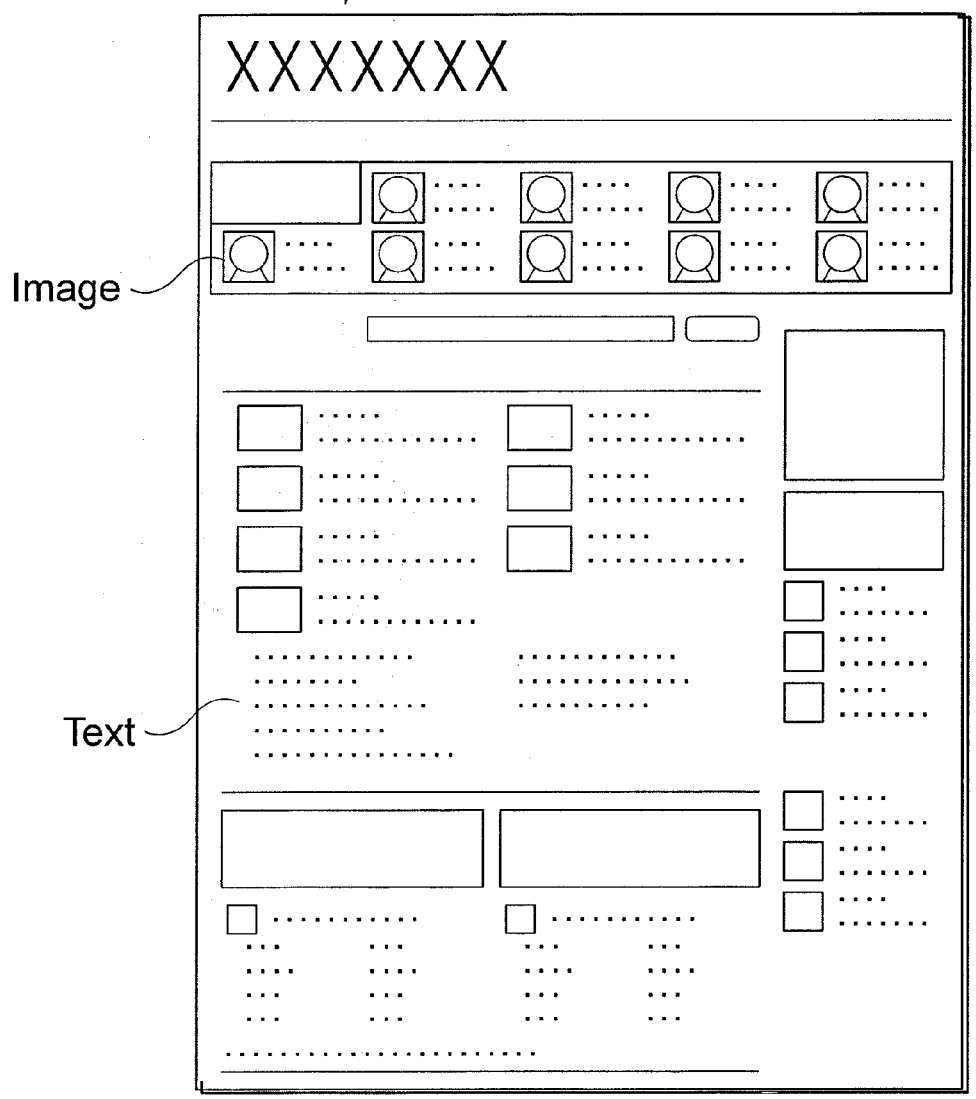
FIG. 4 is a figure illustrating an example of related web page.
Figure 5:
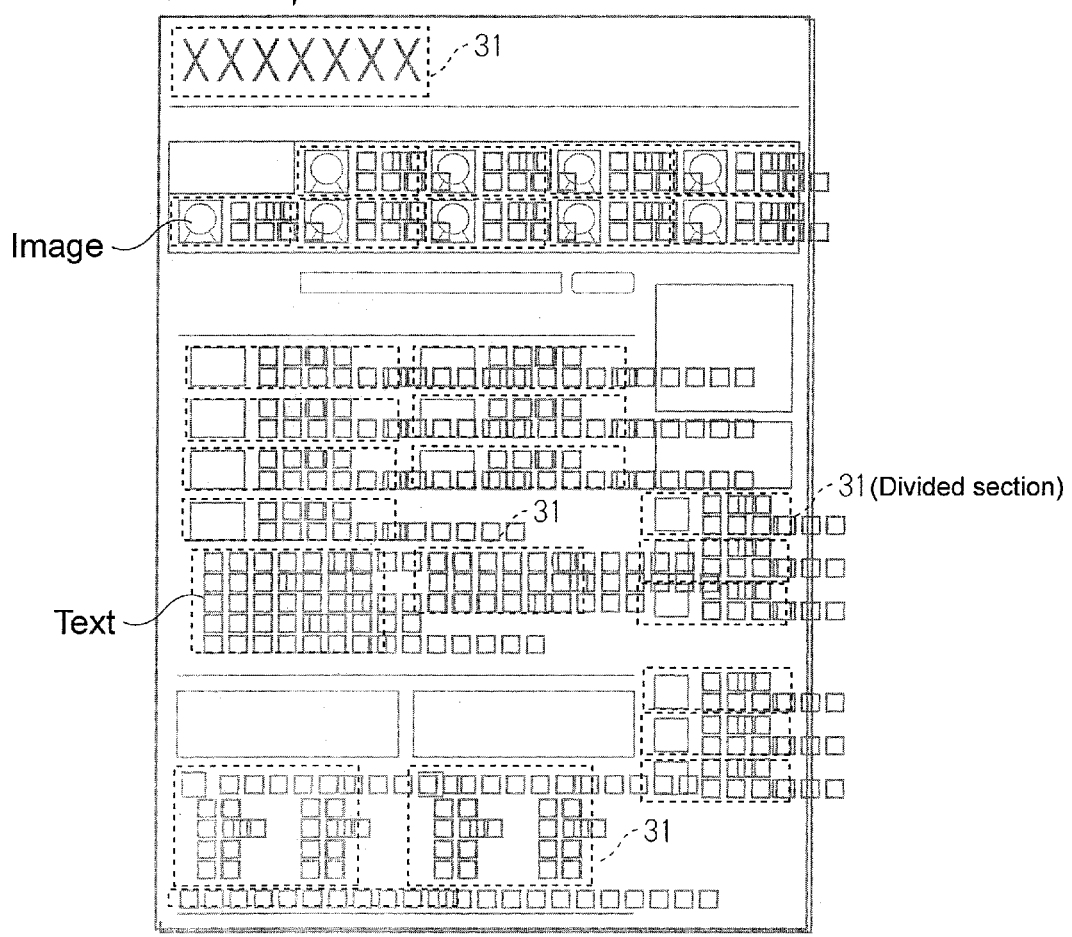
FIG. 5 is a figure illustrating an example of a web site divided into sections.

FIG. 4 is a figure illustrating an example of related web page. The web page is usually generated with a language for generating a web page. On the other hand, different identification tags are attached to a text and an image. For this reason, for example, by finding a position where an identification tag appears, it is possible to classify content in a web page into a text and an image, and in addition, it is possible to find an arrangement of the text and the image in the related web page. By using the identification tags attached to the web page, the content constituting the web page is classified into texts and images. Accordingly, the arrangement of the texts and the images in the web page is found. A sentence explaining an image is given at a position in proximity to the image. Therefore, the web page is divided into multiple sections in order to find what kind of attribute the image belongs to. There is a case where the title and the main body are different in the size of the font or different in the color of the font. For example, the size of the font and the color of the font are distinguished by an identification tag in a language for generating a web page. For this reason, by analyzing the identification tag, the difference of the font can be found. As described above, the web page can be divided into multiple sections. This section information may be corrected by manual input. FIG. 5 is a figure illustrating an example where a certain web site is divided into sections. In the figure, numeral 31 denotes a divided section.

Shown below is an example for distinguishing relationship between content including a sentence and a motion picture included in a section 31 of the web site divided by the section dividing means 26 of the computer 2 and a classification word, i.e., a tag or a category. In this case, for example, it is assumed that three classification words A, B, C are displayed on the web page. First, the web site selecting means 21 of the computer 2 selects a web site in which A exists as a classification word. The section dividing means 26 divides the web site into multiple sections. The word group extracting means 22 determines whether a sentence in a divided section includes the same word as the classification word A, and when the same word is included, a word group is extracted from sentences in the section. Then, the numerical conversion means 23 performs numerical conversion on the relationship of each word with the classification word A. The same processing with the computer is also performed for the classification words B and C.

On the other hand, even when the same word as the classification words A, B, C is not included in sentences in the section of the web site, the classification word can be determined to be related to the section by analyzing the source code of the web site. First, the web site selecting means 21 of the computer 2 selects a web site in which A exists as a classification word. The section dividing means 26 divides the web site into multiple sections. The word group extracting means 22 analyzes identification tags, and when the word group extracting means 22 determines that the classification word A and a sentence in a certain section are related to each other, the word group extracting means 22 extracts a word group in sentences included in the section. The numerical conversion means 23 performs numerical conversion of the relationship of each word with the classification word A. The same processing with the computer is also performed for the classification words B and C.

It should be noted that a section may include content other than a sentence, such as a motion picture and music. In this case, the relationship with only the sentences included in the section may be converted into numerical values. Alternatively, a motion picture and music included in the section may be analyzed to extract the motion picture and the music from text information, and the relationship with the text information may be converted into numerical values.

An example of method for obtaining the frequency includes dividing the number of times a certain word appearing by the number of words included in a word group. More specifically, the computer 2 calculates the number of words included in a certain web page or a certain section, and stores the number of words to the storage unit. On the other hand, the computer 2 calculates the number of times the certain word appears, and stores the number of times to the storage unit. Then, the control unit of the computer 2 reads the number of times n the word appears and the number of words m included in the word group from the storage unit, and performs operation to divide the number of times the word appears by the number of words included in the word group. As described above, the frequency (n/m) can be obtained.

In order to convert the relationship into a numerical value, for example, there is a method as follows. In addition to the frequency explained above, the number of web pages or sections the certain classification word appears is denoted as M, and when the certain word appears in N web pages or sections among the M web pages or sections, N/M is used. An example of numerical value of the relationship in this case is nN/mM. This calculation can be easily performed by performing dividing and multiplying calculations. It should be noted that examples of methods for performing the numerical conversion on the relationship is not limited to the above example. New statistics theory may be used to correct the evaluation method as necessary.

As described above, the computer 2 measures the frequency of each word included in the word group extracted in the word group extracting step in the web sites selected in the web site selecting step, and performs numerical conversion on the relationship between the certain classification word and each word (step 103).

The storage means 24 is means for storing, to the database 25, numerical values obtained by the numerical conversion means for each word included in the word group and each word of the word group included in the sentences of the web sites selected by the web site selecting means in relation to the certain classification word.

The computer 2 includes a database 25. The storage means 24 included in the computer 2, and stores various kinds of information to the database 25. More specifically, the computer 2 stores the certain classification word, the word group explained above, a numerical value of relationship of each word included in the word group. Accordingly, the computer 2 reads the information, associates the information with each other, and stores the information to the database 25.

As described above, the computer 2 stores, to the database 25, the word group included in the sentences of the web sites selected in the web site selecting step and the numerical value obtained in the numeric conversion step for each word included in the word group in relation to the certain classification word (step 104). This operation is performed for multiple classification words. As described above, the database can be obtained that stores multiple classification words, one or more words related to each of the multiple classification words, and a numerical value of the relationship of one or more words with the classification word in association with each other.

A preferred mode of the first aspect of the present invention relates to a method for establishing the database further including a classification word group extracting step (step 100) for extracting a classification word group, i.e., a tag or a category, displayed on a web site from multiple web sites connected with the computer via the electronic communication circuit.

FIG. 20 is a flowchart illustrating a method for establishing a database according to the preferred mode of the first aspect of the present invention further including a classification word group extracting step. The preferred mode of the first aspect of the present invention includes the classification word group extracting step (step 100), the web site selecting step (step 101), the word group extracting step (step 102), the numeric conversion step (step 103), and the storage step (step 104). In addition, the preferred mode of the first aspect of the present invention may include a section dividing step (step 105).

FIG. 21 is a system block diagram for achieving the method for establishing the database according to the preferred mode of the first aspect of the present invention further including classification word group extracting means 27. As shown in FIG. 21, the preferred mode of the first aspect of the present invention includes the classification word group extracting means 27, the web site selecting means 21, the word group extracting means 22, the numerical conversion means 23, and the storage means 24. In addition, the preferred mode of the first aspect of the present invention may include section dividing means 26.

The classification word group extracting means 27 is means for extracting a classification word group, i.e., a tag or a category, displayed on a web site from multiple web sites connected to the computer via the electronic communication circuit. The database 25 of the computer stores multiple classification words. Using the classification words stored in the database 25, a classification word group may be extracted from a web site. Alternatively, an identification tag indicating a classification word may be defined in advance, and by analyzing identification tags (HTML and the like) of the source code constituting the web page, the classification word group may be extracted from the web page. Alternatively, for example, when link information (URL) to another web site is attached together with a certain word in the source code, the word attached with the link information can be identified as a classification word and can be extracted. Alternatively, for example, when the color of the font, the size of the font, and the like of a certain word is distinguished from another word, the word of which color and the like are distinguished can be identified as the classification word and can be extracted. By analyzing the source code of the web site having the tree structure and identifying the directory, the category serving as a classification word can be extracted. It should be noted that the method for extracting a classification word is not limited to the above. Various kinds of methods that can be conceived of by a person skilled in the art can be employed.

As described above, the computer 2 extracts the classification word group from multiple web sites 3 (step 100).

Then, the web site selecting means 21 selects multiple web sites having the certain classification word included in the classification word group extracted by the classification word group extracting means 27, from the web sites connected to the computer 2 via the electronic communication circuit (step 101).

The web site selecting means 21 is means for selecting multiple web sites having the certain classification word. The certain classification word looked up when the web site selecting means 21 selects web sites is included in the classification word group extracted by the classification word group extracting means 27 from multiple web sites. Therefore, even the certain classification word looked up when the web site selecting means 21 selects the web sites can be extracted from multiple web sites automatically in real time.

As described above, the computer 2 extracts a word group included in sentences in the web sites selected by the web site selecting means 21 (step 102).

The numerical conversion means 23 measures, in the sentences included in the web sites selected by the web site selecting means 21, the frequency of each word included in the word group extracted by the word group extracting means 22, and performing numerical conversion of relationship between the certain classification word and each word (step 103).

The storage means stores, to the database 25 of the computer, numerical values obtained by the numerical conversion means 23 for each word included in the word group and each word of the word group included in the sentences of the web sites selected by the web site selecting means 21 in relation to the classification word (step 104).

The section dividing means 26 analyzes identification tags such as HTML tags attached to the web pages selected by the web page selecting means 21, and divides the web page into sections including the identification tags (step 105). Accordingly, the word group extracting means 22 extracts a word group in a section including the certain classification word (step 102). Alternatively, the numerical conversion means 23 may measure the frequency of a word included in the word group extracted by the word group extracting means, and may perform numerical conversion on the relationship between the certain classification word and each word (step 103).

A second aspect of the present invention relates to an information recommending method with a computer using a database. This database is basically a database established by the method for establishing the database according to the first aspect. More specifically, this database is a database storing stores multiple classification words, one or more words related to each of the multiple classification words, and a numerical value of the relationship of one or more words with the classification word in association with each other.

In this method, information is recommended as follows. FIG. 6 is a flowchart for explaining the information recommending method with the computer using the database according to the present invention. As shown in FIG. 6, this method includes word extracting step (step 201), a classification word extracting step (step 202), a web page search step (step 203), and link display step (step 204).

FIG. 7 is a block diagram illustrating a computer for achieving this information recommending method. As shown in FIG. 7, the computer 2 includes a word extracting means 41, a classification word extracting means 42, a web page search means 43, a link displaying means 44, and a database 45.

The word extracting means 41 is means for extracting a word included in a certain web page.

A text of the certain web page is input to the computer 2. Then, the word extracting means 41 of the computer 2 extracts a word included in the web page. The word includes one or multiple words. The method for extracting the word is as explained above. More specifically, the web page may be divided into sections, the word database may be accessed as necessary, and a word included in the web page may be extracted.

As described above, the computer 2 extracts a word included in the certain web page (step 201).

The classification word extracting means 42 uses the word extracted by the word extracting means to access the database and extract a classification word from the database. More specifically, the word extracted by the word extracting means is stored to the storage unit of the computer 2. Then, the stored word is read, the database is accessed, and a classification word of which numerical value representing the relationship with the word is extracted. When multiple classification words are extracted, one or more classification words determined to have a high degree of relationship with multiple words are extracted. For example, when multiple words are included in a web page, each of the classification words corresponding to the multiple words is obtained. Then, one or more classification words of which frequency of appearance is the highest may be extracted. As described above, the gist of the web page can be appropriately understood by extracting the classification word related to the certain web page.

As described above, the computer 2 uses the word extracted in the word extracting step to access the database, and extracts the classification word from the database (step 202).

The web page search means 43 is means for searching a related web page using the classification word extracted by the classification word extracting means.

An example of related web page includes a web page included in the same web site as that of the certain web page explained above. More specifically, the computer 2 stores a web page in the certain web site. Then, the classification word is read, and the web site is read one by one, so that a web page including the classification word is searched. Therefore, the web page including the classification word can be extracted. Alternatively, as explained later, the computer 2 may allocate classification words to web pages in advance, and accordingly, the computer 2 may extract a web page having the same classification word as that extracted by the classification word extracting means or a classification word having a high degree of similarity.

It is to be understood, when the computer 2 is connected to the Internet, the computer 2 may search, via the Internet, a web page that includes the classification word extracted by the classification word extracting means or a web page that is related with the classification word with a high degree of relationship.

As described above, the computer 2 can search the related web page using the classification words extracted by the classification word extracting step (step 203).

The link displaying means 44 is means for displaying a link to the web page searched and extracted by the web page search means. For example, when a link to a web page in a certain web site is displayed, the computer 2 stores link information for displaying each web page. Therefore, the link displaying means 44 may read link information to the searched web page from the storage unit, and the link information may be displayed on the web page from which the word has been extracted. Then, the computer 2 can display the web page from which the word has been extracted as well as the link information.

When the web page search means 43 searches web pages provided by servers connected to the computer 2 via the Internet, the computer 2 stores access information (for example, URL) to the web pages obtained by performing the search. Then, the stored access information may be used as link information, and is used for display in the same manner as described above.

As described above, the computer 2 can display the link to the web page searched in the web page search step (step 204).

Therefore, certain information related to the certain web page can be automatically displayed as a link. Moreover, instead of searching the related web page using a word included in the certain web page, the related web page is searched using the classification word related to the certain web page, so that by appropriately finding the meaning of the web page, the related page reflecting the preference can be effectively displayed.

In other words, it is possible to search the related web page using the meaning of the web page and the word (classification word) appropriately representing the preference even though it does not appear explicitly in the certain web page. Although the meaning of the web page changes as the time passes, this enables appropriately finding the meaning suitable at that time and performing searching. Therefore, with the present invention, the related page reflecting the meaning and the preference in real time can be effectively recommended.

A third aspect of the present invention relates to an information matching method of an advertisement and the like with a computer using a database. This database is basically a database established by the method for establishing the database according to the first aspect. More specifically, this database is a database storing stores multiple classification words, one or more words related to each of the multiple classification words, and a numerical value of the relationship of one or more words with the classification word in association with each other.

It should be noted that the third aspect of the present invention is not limited to the information matching of the advertisement as described above.

FIG. 8 is a flowchart for explaining a matching method according to the present invention. As shown in FIG. 8, in this matching method, matching is made as follows.

Classification words of multiple web pages are determined in a first word extracting step (step 301), a first classification word extracting step (step 302), and a related classification word storing step (step 303). The multiple web pages may be advertisement-linked web pages having advertisements being media.

In addition, in parallel therewith, the preference of a user who uses a certain client is analyzed in a second word extracting step (step 311) and a second classification word extracting step (step 312).

Then, the user's preference and the advertisement-linked web page having advertisements being media or each web page are matched in a web page selecting step (step 321) and an access information displaying step (step 322).

FIG. 9 is a block diagram of a computer for achieving the matching method according to the present invention. As shown in FIG. 9, this computer 2 includes a first word extracting means 51, a first classification word extracting means 52, a related classification word storing means 53, a second word extracting means 54, a second classification word extracting means 55, a web page selecting means 56, an access information displaying means 57, and a database 58.

The first word extracting means 51 is means for extracting a word included in a web page of each of multiple web pages. Multiple web pages may be a web page group included in a certain web site, or may be web pages provided by a server connected to the computer 2 via the Internet. Alternatively, multiple web pages may be advertisement-linked web pages having advertisements as media. The method for extracting words from the web pages is as described above. Like what has been described above, the computer 2 extracts a word included in a web page of each of multiple web pages (step 301).

The first classification word extracting means 52 is means for using the words extracted by the first word extracting means to access the database, extracting classification word from the database, and thereby extracting the classification word related to each of the web pages. In the same manner as the classification word extracting means explained above, the first classification word extracting means 52 extracts the classification word. Therefore, by doing the same as what has been explained above, the computer 2 uses the word extracted in the first word extracting step to access the database and extract the classification word from the database, thereby extracting the classification word related to each web page (step 302).

The related classification word storing means 53 is means for storing the access information to each web page explained above and the classification word related to each of the web pages extracted in the classification word extracting step in association with each other. The related classification word storing means 53 may store the above information to the database 58. In the processing at this occasion, the processing explained above may be used as necessary. Therefore, the access information to each web page explained above and the classification word related to each of the web pages extracted in the classification word extracting step are related to each other and are stored (step 303).

The second word extracting means 54 is means for extracting a word included in action information of a certain client. In the certain client, there remains a history of actions of a user. Examples of histories of actions include words used for search of the Internet, viewed web pages, a log of the Internet, and site information accumulated in cookies.

Examples of words included in the action information may include words included in web pages viewed with the client. Alternatively, the words included in the action information may be classification words which the client extracted by accessing the database using the word group included in the viewed web pages. This enables matching of information truly reflecting the preference and the interest of the client.

The second word extracting means 54 reads any one of or two kinds or more of information thus stored in the storage unit of the client 4. Then, the second word extracting means 54 extracts words included in the read information. The extraction processing of the word can be performed in the same manner as described above. As described above, the computer 2 extracts words included in the action information of the certain client (step 311). The computer 2 and the certain client may be the same terminal, or the computer 2 and the certain client may be separate terminals connected via the Internet.

The second classification word extracting means 55 is means for using the word extracted by the second word extracting means to access the database and extract the classification word from the database, thereby extracting the classification word related to each of the clients. The processing performed by the second classification word extracting means 55 is the same as that explained above. As described above, using the word extracted by the second word extracting step, the database is accessed to extract classification words from the database, and thereby the classification word related to each of the clients is extracted (step 312).

The web page selecting means 56 is means for using the classification word extracted by the second classification word extracting means and the classification word extracted by the first classification word extracting means to obtain a web page having a classification word related to the classification word extracted by the second classification word extracting means. The classification word extracted by the second classification word extracting means reflects the user's preference. On the other hand, the classification word extracted by the first classification word extracting means reflects the gist of each web page. By matching the classification word extracted by the second classification word extracting means and the classification word extracted by the first classification word extracting means with each other, it is possible to select an advertisement-linked web page having an advertisement as a medium or a web page that matches the user's preference. The matching processing of the classification words may be achieved by a method for obtaining the degree of similarity of tags disclosed in, for example, Japanese Patent Laid-Open No. 2009-259258. As described above, using the classification word extracted in the second classification word extracting step and the classification word extracted in the first classification word extracting step, the web page having the classification word related to the classification word extracted in the second classification word extracting step is obtained (step 321).

On the other hand, for example, in a case of an advertisement-linked web page having an advertisement as a medium, a classification word is sometimes allocated manually when an advertisement material (such as a text and an image) is received. In this case, instead of the classification word extracted in the first classification word extracting step (step 302), the matching processing between the classification words may be performed using this classification word manually allocated.

The access information displaying means 57 is means for displaying, on the client 4, the access information to the web page stored in the related classification word storing step. Accordingly, the computer 2 causes the client 4 to display the access information to the advertisement-linked web page having the advertisement as the medium or the web page stored in the related classification word storing step (step 322).

First Embodiment

A first embodiment relates to a method for establishing a database for making, into a score, relationship between a web site having a classification word and a word group included in the web site including the classification word.

In this example, the computer 2 has a database. For example, the database stores "pretty" as a classification word. This database stores a word group "pet" and "cat" related to the classification word "pretty", a URL of a web page including the word group, and a value representing relationship with the classification word "pretty". Further, the computer 2 selects multiple web sites having the classification word "pretty" from web sites connected to the computer 2 via the electronic communication circuit (step 101).

Then, the computer 2 extracts a text from the selected web site as necessary, and extracts a word group included in sentences of the web site (step 102).

The computer 2 calculates the number of characters of the extracted word group. Then, for example, the number of times the word "pet" appears is also calculated. In addition, the computer 2 calculates the number of web sites selected and calculates the number of selected web sites in which the word "pet" appears. Then, using the information, the computer 2 measures, in the web site selected in the web site selecting step, the frequency of each word included in the word group extracted in the word group extracting step, performs numerical conversion on relationship between the word "pet" and the certain classification word "pretty" (step 103).

Among them, the computer 2 updates the numerical value of the relationship of the word "pet" stored in the database in relation to the certain classification word "pretty" (step 104). The numerical value of the relationship of the word "cat" in relation to the classification word "pretty" can also be updated in the same manner. By repeatedly continuing to perform this operation on all the classification words, words related to the certain classification words can always be updated.

Second Embodiment

Figure 10:
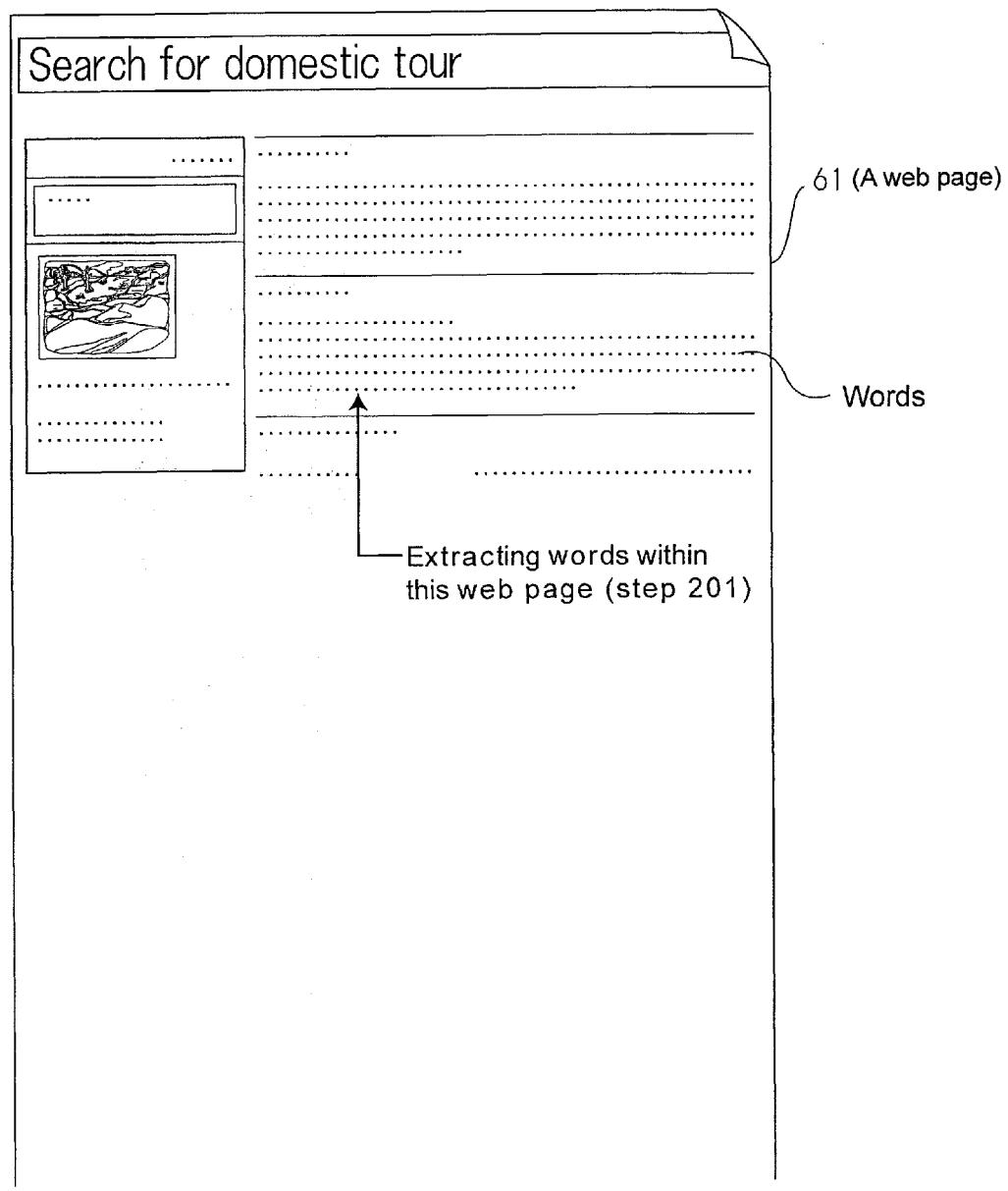
FIG. 10 is a schematic diagram illustrating a computer into which a text of a certain web page is input.

A second embodiment relates to an information recommending method with a computer using a database. A text of a certain web page is input to the computer. FIG. 10 is a schematic diagram illustrating a computer into which a text of a certain web page is input.

Then, the computer according to the present invention extracts a word included in a web page 61 (step 201).

The computer 2 uses the extracted word to access a database, and extracts a classification word from the database (step 202). At this occasion, examples of classification words include domestic travel, Atami, and expensive Japanese inn. Examples of extracted words include words "domestic travel" and "Atami", but may not include the word "expensive Japanese inn". For example, the classification word "expensive Japanese inn" may be extracted from words such as "100,000 Yen per a night", "annex", and "seafood" included in the web page 61.

The computer 2 uses the classification words "domestic travel", "Atami", and "expensive Japanese inn" to search related web pages (step 203). This search may be performed on web pages stored in the same server as the server in which the web page 61 is stored.

Figure 11:
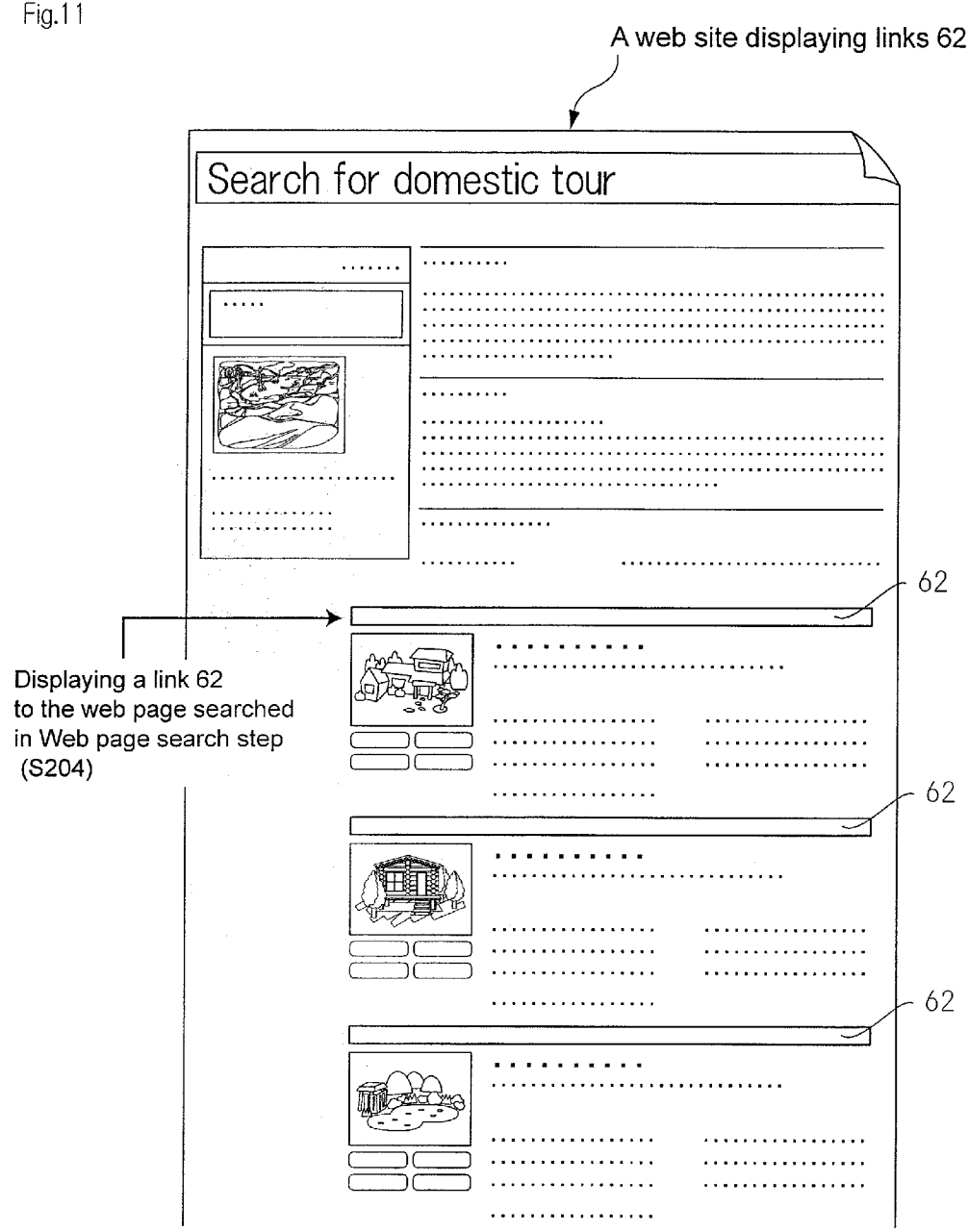
FIG. 11 is an example of a web site displaying links.

The computer 2 displays a link 62 to the web pages searched in the web page search step (step 204). FIG. 11 is an example of a web site displaying links. As shown in FIG. 11, the computer 2 may find even images included in the web pages related to the above classification word with a high degree of relationship, and may display the images together.

In this embodiment, when a newspaper article is input to the client as a text of a web page, a link to a web page related to the newspaper article may be automatically displayed. For example, when an article about entertainment news is generated, and the article is input to the client, articles in the past related to an entertainer may be automatically linked, and may be displayed in a lower portion of the article.

Third Embodiment

A third embodiment relates to an information matching method such as advertisement with a computer using a database. The computer 2 extracts words from each of multiple web pages (step 301). Then, a classification word related to each web page is extracted (step 302). The access information to each web page and the classification word related to each web page (classification word representing the gist of the web page) are related to each other and stored (step 303).

Figure 12:
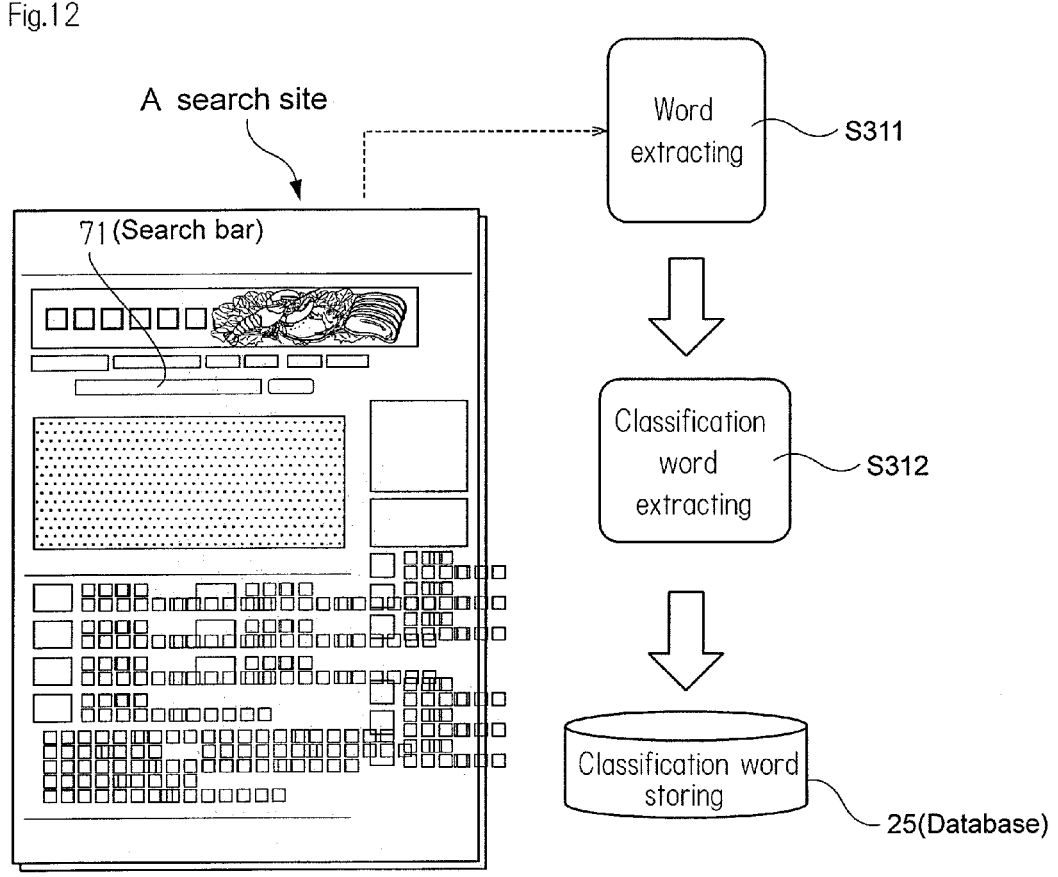
FIG. 12 is a display screen illustrating a certain search site.

FIG. 12 is a display screen illustrating a certain search site. This search site includes a search bar 71. The search word is input to the search bar 71. Then, the client stores the word input to the search bar to the storage unit. When this operation is repeated, multiple words input by the client are stored.

Then, the computer 2 reads the words input to the search bar stored in the storage unit of the client (step 311). The information read here is not limited to the words input to the search bar. Alternatively, any one of or two kinds or more of the action history of the user may be read. The computer 2 uses the words to extract a classification word (classification word representing the user's preference) (step 312).

Examples of words included in the action information include words included in the web pages viewed by the client. The client uses the word group included in the viewed web page to access the database, and uses the extracted classification word.

Figure 13:
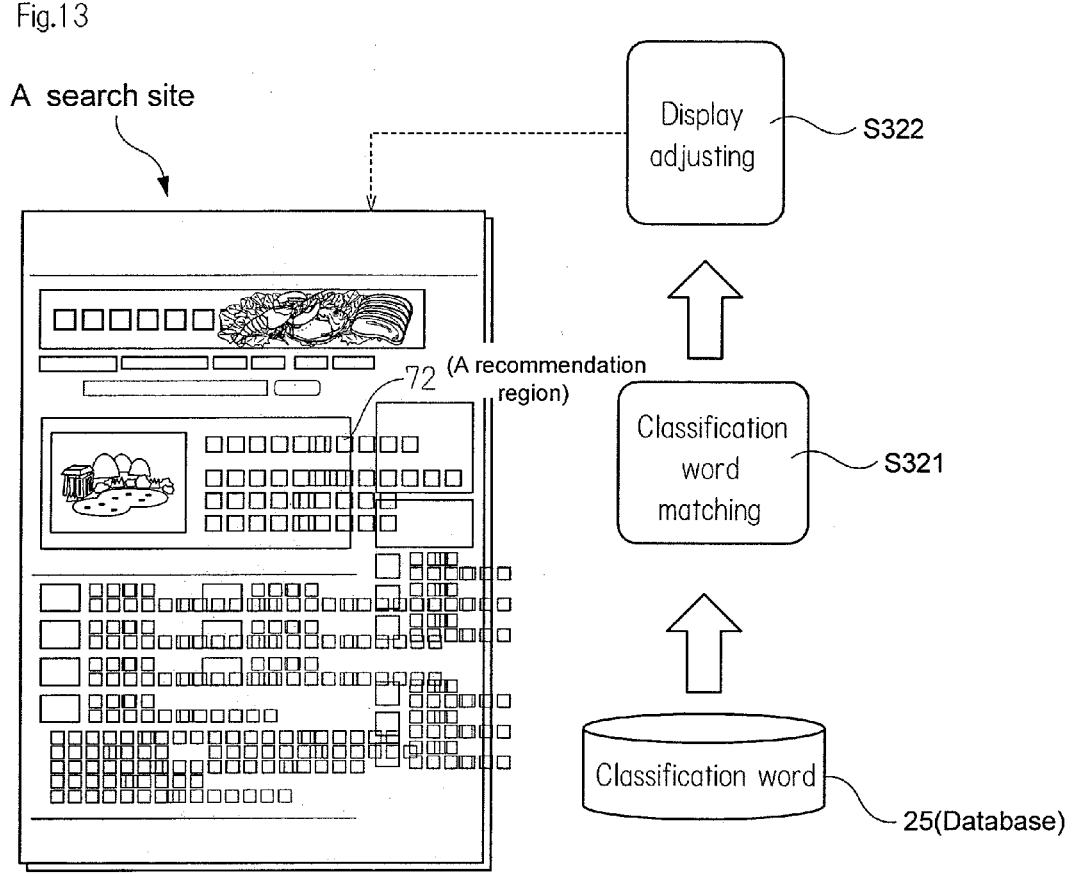
FIG. 13 illustrates an example in which information about a web page that matches a user's preference is displayed in a recommendation region of a search site having a recommendation function.

Thereafter, the computer 2 matches the classification word representing the gist of the web site and the classification word representing the user's preference. Accordingly, a web page matching a user's preference or an advertisement-linked web page having an advertisement as medium are obtained (step 321). Thereafter, the computer 2 displays access information to the web page including link information to the web page matching the user's preference (step 322). FIG. 13 illustrates an example in which information about a web page that matches a user's preference is displayed in a recommendation region of a search site having a recommendation function.

FIG. 13 illustrates an example in which information about a web page that matches the user's preference is displayed in a recommendation region of a search site having a recommendation function. This may be an advertisement-linked web page having an advertisement as a medium that matches the user's preference. In FIG. 13, reference numeral 72 denotes a recommendation region of the search site.

Fourth Embodiment 4

A fourth embodiment relates to classification words used in the first aspect of the present invention (the method for establishing the database), the second aspect of the present invention (information recommending method), and the third aspect of the present invention (matching method of information) of the present invention. In particular, the fourth embodiment relates to tags, i.e., classification words, attached by an administrator of a web site.

Figure 14:
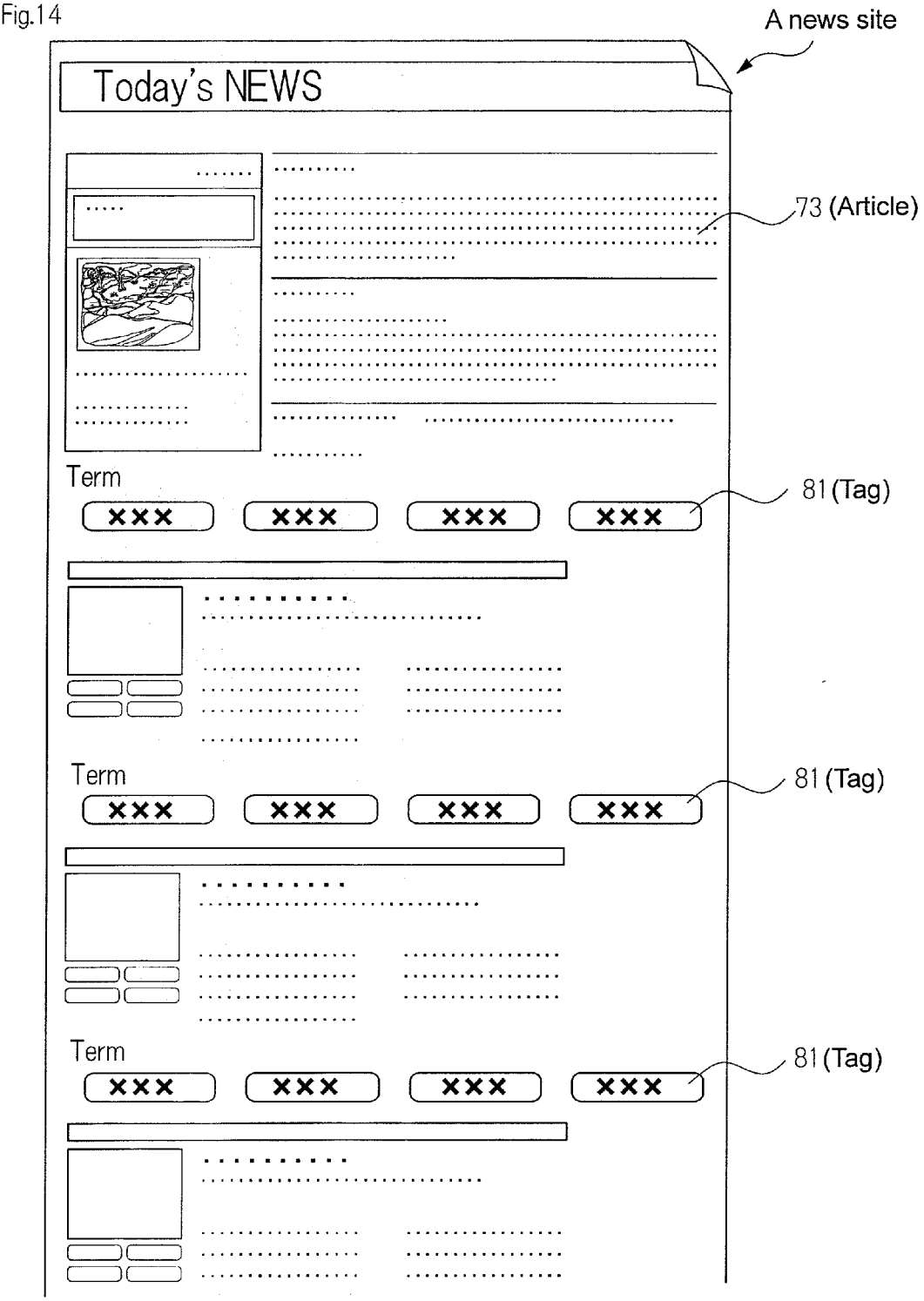
FIG. 14 is an example of a certain web site (news site) displaying tags.

FIG. 14 is a display screen of a certain news site. This news site includes tags 81. The tags 81 are attached by the administrator of the news site. The tag 81 relates to a sentence included in the web page ("today's news"). For example, when a term appearing in the news described in the article 73 is difficult to be understood by an ordinary viewer because, e.g., the term is a specialized term, the administrator of the news site adopts the term as the tag 81. Then, the administrator attaches, to this tag 81, link information to a site explaining this term. Therefore, the viewer of the news site can be linked to the site explaining the term via the tag 81.

For example, in the first aspect of the present invention (the method for establishing the database), the word group extracting means extracts a word group from the article 73 related to the tag 81 (step 103). Thereafter, the numerical conversion means measures, in the article 73, the frequency of appearance of each word included in the word group extracted from the article 73, and performs numerical conversion on relationship between the tag 81 (term) and the word (step 104). Then, the numerical value of the relationship obtained with regard to the tag 81 (term) and the word group included in the article 73 and the word included in the word group is stored to the database of the computer (step 105).

Fifth Embodiment

A fifth embodiment relates to classification words used in the first aspect of the present invention (the method for establishing the database), the second aspect of the present invention (information recommending method), and the third aspect of the present invention (matching method of information) of the present invention. In particular, the fifth embodiment relates to tags, i.e., classification words, attached by a poster of a certain hosting site.

Figure 15:
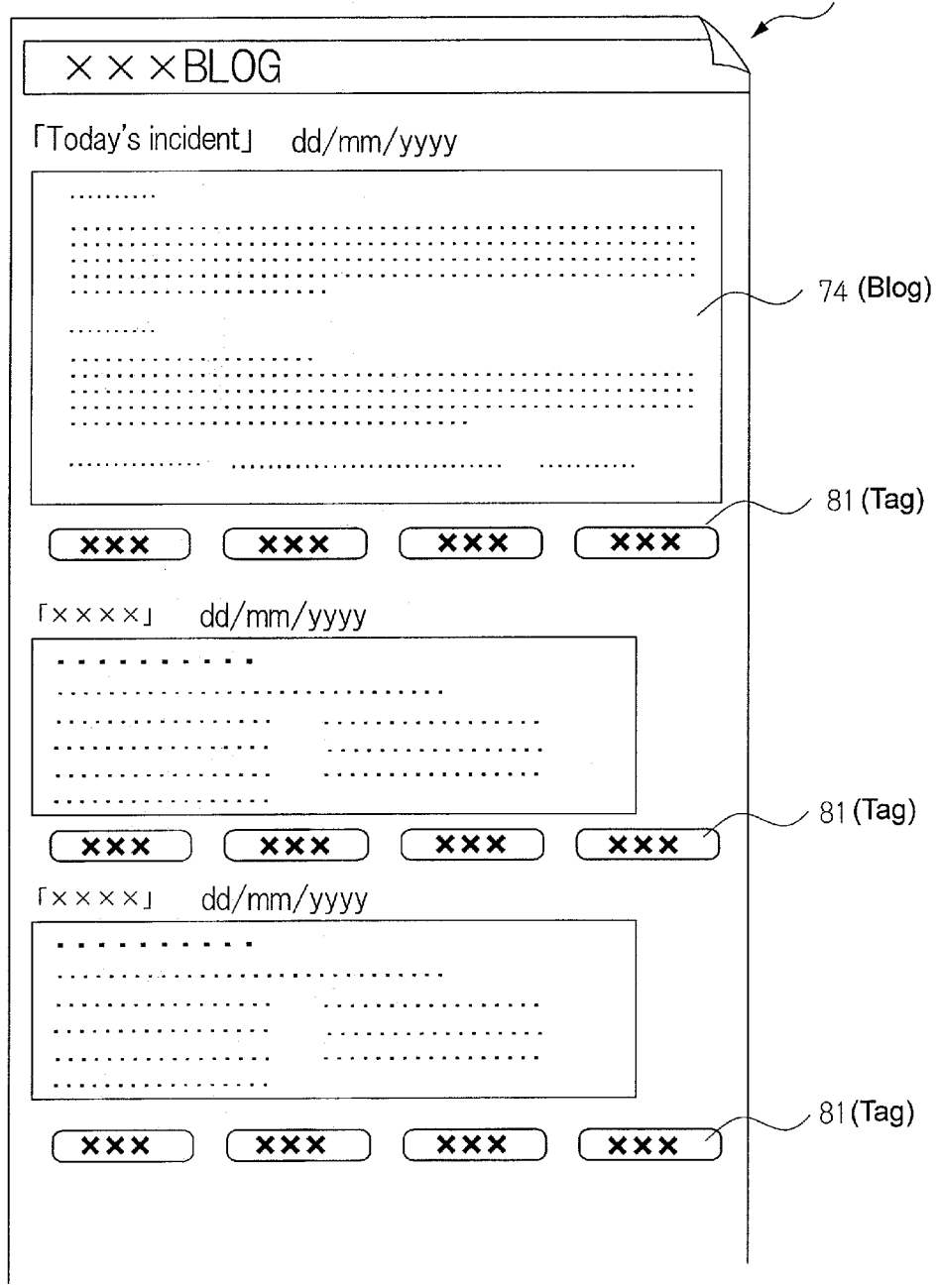
FIG. 15 is an example of a certain web site (blog site) displaying tags.

FIG. 15 is a display screen of a certain hosting site (so-called blog site). This blog site includes tags 81. The tags 81 are attached by the poster of the hosting site. The tags 81 are attached to briefly represent the contents of the sentences included in the web page ("today's event"). For example, when the poster who generated a blog 74 wants to briefly express the contents of "today's event" described in the blog 74, the word briefly representing the blog is adopted as a tag 81. For example, when the "today's event" is a blog describing visit to cherry blossom viewing and eating a dumpling. Alternatively, the tags 81 may be "cherry blossom viewing", "dumpling", and the like. Still alternatively, words such as "fun", "beautiful", "day, month (date)", and the like can be adopted as the tag 81 even though they are words that are not directly described in the blog 74. In addition, link information to another web page may be attached to the tag 81. In this case, for example, when the viewer of the hosting site clicks the tag 81 of the "cherry blossom viewing", the viewer can be linked to a site in which blogs about the "cherry blossom viewing" are accumulated and categorized. When the viewer of the web page follows the tag 81, the viewer can be linked to the site in which articles and blogs about the tag is categorized. When the types of the tags 81 are generated in advance by the administrator of the hosting site, the poster can select and use the tags therefrom.

Sixth Embodiment

A sixth embodiment relates to classification word used in the first aspect of the present invention (the method for establishing the database), the second aspect of the present invention (information recommending method), and the third aspect of the present invention (matching method of information) of the present invention. In particular, the sixth embodiment relates to categories, i.e., classification words, attached by an administrator of a certain web site.

Figure 16:
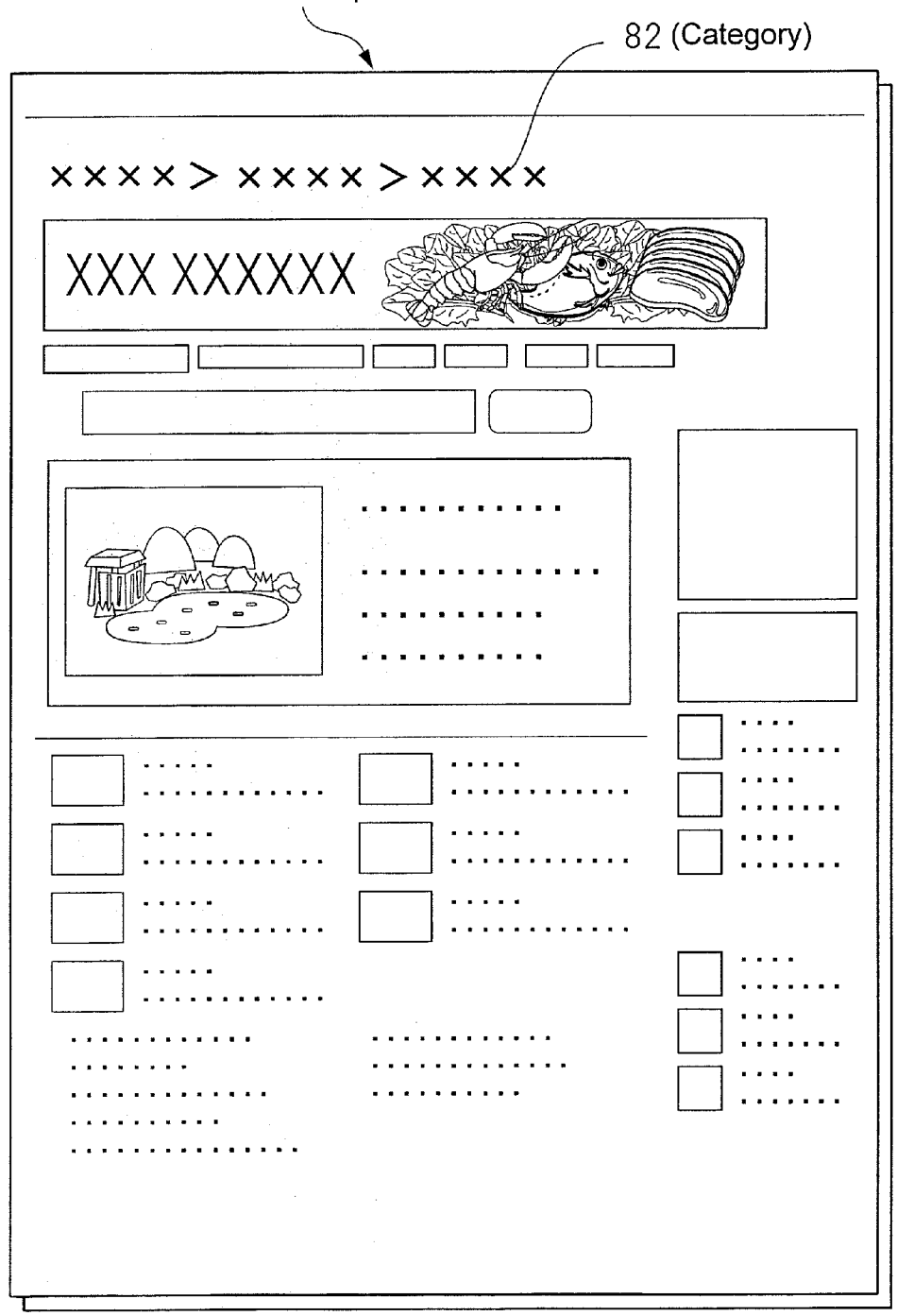
FIG. 16 is an example of a certain web site (information portal site) displaying a category.

FIG. 16 is a display screen of a certain information portal site. This information portal site includes a category 82. This category 82 is provided by an administrator of the information portal site. This web site has a tree structure, and the category 82 represents the directory of the tree structure. The category 82 is index information which is made by the administrator of the web site in advance by summarizing, according to respective fields and regions, the articles and the sentences displayed on the web page. For example, when the information portal site relates to search of restaurants, the category 82 attached to the web page is displayed as follows: "whole country>Kanto>Tokyo". This indicates that the web page currently opened belongs to the category "Tokyo", and the word group displayed in this web page is related to restaurants in "Tokyo". In addition, link information to another web page can be attached to the category 82. In this case, for example, when the viewer of the information portal site clicks the category "Kanto", the viewer can be linked to a site categorizing and collecting information about restaurants in "Kanto".

For example, in the first aspect of the present invention (the method for establishing the database), the word group extracting means extracts a word group from the web page in which the category 82 is included (step 103). Thereafter, the numerical conversion means measures, in the web page, the frequency of appearance of each word included in the word group extracted from the web page. The numerical conversion is performed on relationship between the category and the word (step 104). Then, the numerical value of the relationship obtained with regard to the category 82 and the word group included in the web page and the word included in the word group is stored to the database of the computer (step 105).

Seventh Embodiment

A seventh embodiment relates to classification words used in the first aspect of the present invention (the method for establishing the database), the second aspect of the present invention (information recommending method), and the third aspect of the present invention (matching method of information) of the present invention. In particular, the seventh embodiment relates to categories, i.e., classification words, selected by a poster of a certain hosting site.

Figure 17:
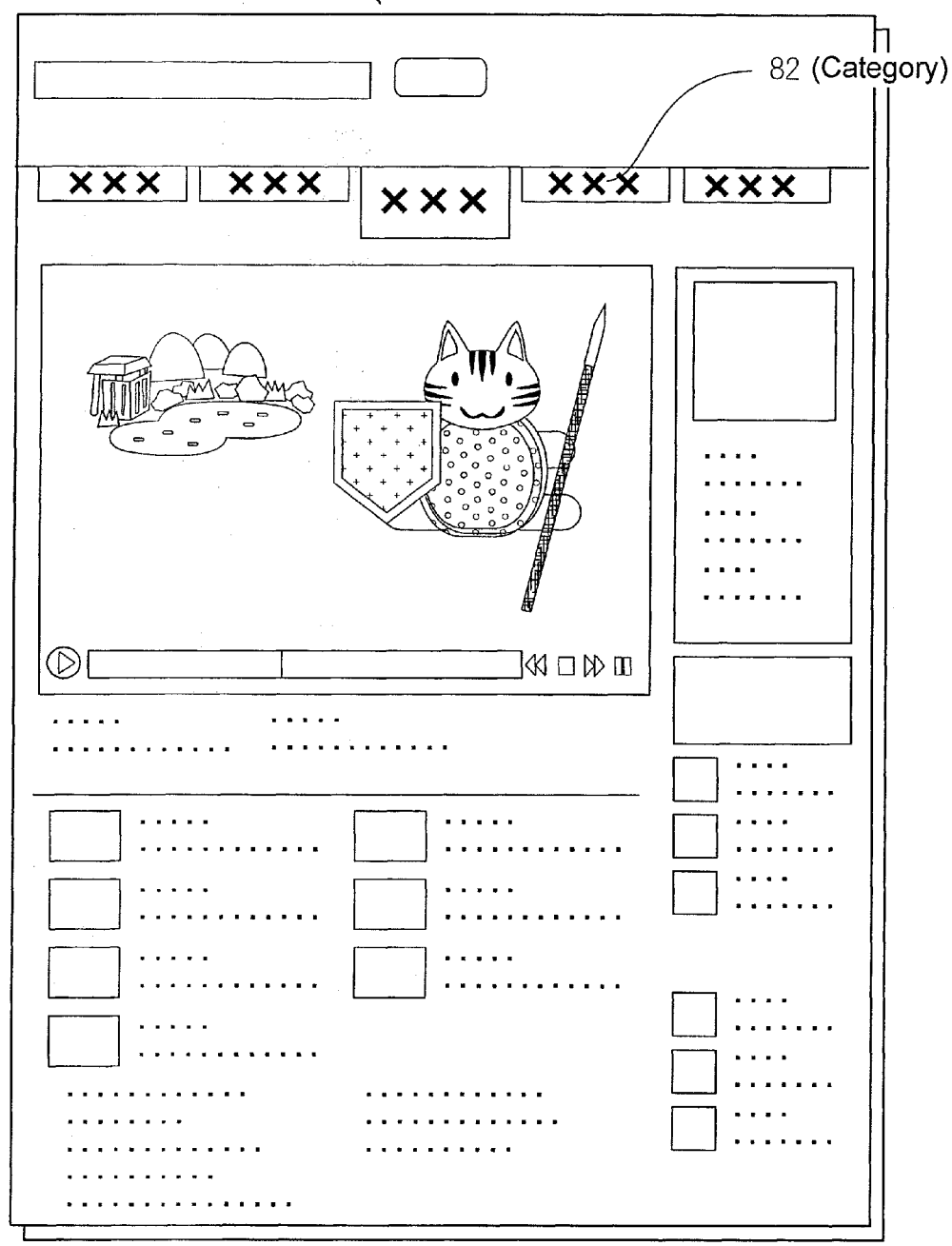
FIG. 17 is an example of a certain web site (motion picture sharing site) displaying a category.

FIG. 17 is a display screen of a certain motion picture sharing site. This motion picture sharing site includes a category 82. This web site has a tree structure, and the category 82 represents the directory of the tree structure. The category 82 is index information which allocated from among multiple fields and regions prepared by the administrator of the hosting site in advance when the poster himself/herself makes a selection. For example, the category 82 attached to the web page is displayed such as follows: "movie", "drama", "animation", and the like that can be viewed on the motion picture sharing site. The poster of the motion picture selects a category considered to be most suitable for the motion picture posted by the poster himself/herself from this category 82, and posts the motion picture. For example, it is found that the web page currently opened belongs to the category "animation", and therefore, the word group displayed on this web page is related to "animation". In addition, link information to another web page can be attached to the category 82. In this case, for example, when the viewer of the motion picture sharing site clicks the category 82 of "drama", the viewer can be linked to a site categorizing and collecting information about motion pictures of "drama".

Eighth Embodiment

An eighth embodiment relates to classification words used in the first aspect of the present invention (the method for establishing the database), the second aspect of the present invention (information recommending method), and the third aspect of the present invention (matching method of information) of the present invention. The eighth embodiment relates to a web site in which both of the tags and the categories are attached as the classification words.

Figure 18:
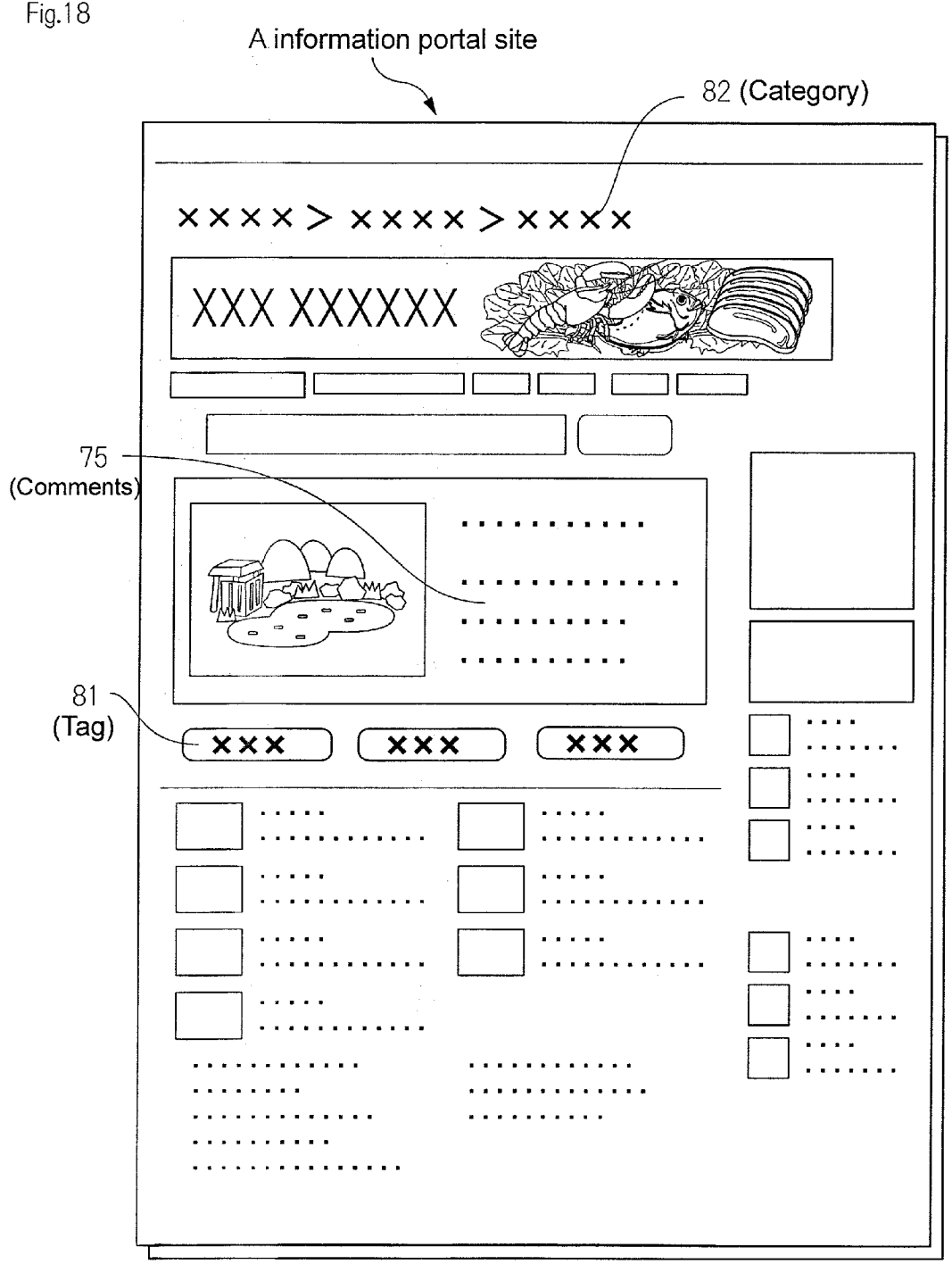
FIG. 18 is an example of a certain web site (information portal site) displaying tags and a category.

FIG. 18 is a display screen of a certain information portal site. This information portal site includes tags 81 and a category 82. The tags 81 are attached by the poster to briefly represent the contents of a comment 75. The category 82 is index information, summarized according to respective fields and regions, which is made by the administrator of the information portal site.

Ninth Embodiment

A ninth embodiment relates to a method for establishing a database for making, into a score, relationship between a classification word included in a web site and a word group included in the web site including the classification word. In particular, the ninth embodiment relates to a method for establishing a database including a classification word group extracting step.

In this example, the computer 2 extracts, from multiple web pages, a classification word group displayed on the web page as tags. For example, it is assumed that a word "pretty" is displayed as a tag on the web page. In this web page, words such as "pet" and "cat" are included in sentences related to the tag "pretty". In addition, it is assumed that, in another web page, words "beautiful" and "cool" are displayed as tags. The computer 2 extracts words "pretty", "beautiful", and "cool" as classification word tags from the web sites connected to the computer 2 via the electronic communication circuit (step 100).

Then, the computer 2 selects, from the web sites connected via the electronic communication circuit, multiple web sites having, e.g., a word "pretty", among the tags "pretty", "beautiful", and "cool" extracted from the web sites (step 101).

The computer 2 extracts a text from the selected web sites as necessary, and extracts a word group included in sentences of the web sites (step 102).

The computer 2 calculates the number of characters of the extracted word group. Then, for example, the number of times the word "pet" appears is also calculated. In addition, the computer 2 calculates the number of web sites selected, and calculates the number of sites of the selected web sites in which the word "pet" appears. Then, on the basis of the above information, the computer 2 calculates, in the web sites selected in the web site selecting step, the frequency of each word included in the word group extracted in the word group extracting step, and performs numerical conversion on the relationship between the classification word "pretty" and the word "pet" (step 103).

Thereafter, the computer 2 updates the numerical value of the relationship of the word "pet" stored in the data base in relation to the classification word "pretty" (step 104). Likewise, the numerical value of the relationship of the word "cat" in relation to the classification word "pretty" can be updated.

By repeatedly performing this operation on the classification words "beautiful" and "cool" which are the tags extracted from the web sites by the computer 2, the database storing the words related to the classification words and the numerical values of the relationships thereof can be established. When the computer 2 is programmed to perform the processing for extracting classification words from web sites with a regular interval, the database can be updated automatically in real time.

INDUSTRIAL APPLICABILITY

The present invention relates to information communication technology, and therefore, the present invention can be used in a field of information communication technology.

REFERENCE SIGNS LIST 2 computer
21 web site selecting means
22 word group extracting means
23 numerical conversion means
24 storage means
25 database
26 section dividing means
27 classification word group extracting means

The invention claimed is:

1. An information recommending method with a computer using a database storing multiple classification words displayed as a tag or a category in a web site, one or more words related to each of the multiple classification words, and a numerical value of the relationship of one or more words with the classification word in association with each other,
wherein the tag is text information displayed on the web page as which is representing the gist of a word group included in sentences of the web site,
the method comprises a step of establishing the database, wherein the step for establishing the database comprises:
a web site selecting step in which the computer selects multiple web sites having a certain classification word from web sites connected to the computer via an electronic communication circuit;
a word group extracting step in which the computer extracts the word group included in the sentences in the web sites selected in the web site selecting step;
a numeric conversion step in which the computer measures, in the web sites selected in the web site selecting step, a frequency of each word included in the word group extracted in the word group extracting step, and performs numerical conversion on a relationship between the certain classification word and each word to determine the numerical value; and
a storage step in which the computer stores, to the database, the numerical value obtained in the numeric conversion step for each word included in the word group and each word of the word group included in the sentences of the web sites selected in the web site selecting step in relation to the certain classification word,
a first word extracting step of extracting words included in each of multiple web pages;
a first classification word extracting step of accessing the database using the words extracted in the first word extracting step, and extracting a classification word from the database, and thereby extracting the classification word related to each of the web pages;
a related classification word storing step of storing access information to each of the web pages and the classification word related to each of the web pages extracted in the first classification word extracting step in association with each other;
a second word extracting step of extracting words used for a search of the Internet by a certain client or words included in web pages viewed by the certain client;
a second classification word extracting step of accessing the database using the words extracted in the second word extracting step, and extracting a classification word from the database, and thereby extracting the classification word related to each client;
a web page selecting step of obtaining a web page having a classification word related to the classification word extracted in the second classification word extracting step using the classification word extracted in the second classification word extracting step and the classification word extracted in the first classification word extracting step; and
an access information displaying step of reading out the access information to the web page obtained in the web page selecting step from the access information stored in the related classification word storing step, and displaying the access information read out on the client;
therefore, the preference of a user of the client that can be read from the certain client and the web page suitable for the preference can be matched.

2. The method accordance with claim 1, wherein the classification word is attached with link information to another web site.

3. The method accordance with claim 1,
wherein the web site selecting step in which the computer extracts multiple web sites having the certain classification word on the basis of the identification tag allocated to the web site.

4. The method accordance with claim 1,
wherein the method further comprises a section dividing step in which the computer divides the web sites selected in the web site selecting step into multiple sections by analyzing the identification tags,
in a word group extracting step, the computer extracts a word group from sentences in a section including the certain classification word among the sentences in the sections of the web sites divided in the section dividing step.

5. The method accordance with claim 1,
wherein the method further comprises a classification word group extracting step in which the computer extracts a classification word group as a tag or a category displayed on web sites from multiple web sites connected to the computer via an electronic communication circuit, classification word included in the classification word group extracted in the classification word group extracting step from the web sites connected to the computer via the electronic communication circuit.

6. The method accordance with claim 1, wherein at least one of the classification words is stored as the tag.

7. An information recommending method with a computer using a database storing multiple classification words, one or more words related to each of the multiple classification words, and a numerical value of the relationship of the one or more words with the classification word in association with each other, the method comprising:

establishing the database by the computer, the establishing of the database further comprising selecting multiple web sites, each having a certain classification word, the multiple web sites being selected from web sites connected to the computer via an electronic communication circuit;

extracting a word group included in sentences in the selected web sites;

measuring a frequency of each word included in the extracted word group in the selected web sites, and performing numerical conversion on a relationship between the certain classification word and each word; and step for each word included in the word group and each word of the word group included in the sentences of the selected web sites in relation to the certain classification word;

extracting a gist of a plurality of first web pages, the establishing of the gist of the first web pages further comprising extracting first words included in each of the first web pages;

accessing the database using the extracted first words, and extracting a first classification word from the database, thereby extracting the first classification word related to each of the first web pages; and storing access information for each of the first web pages and the extracted first classification word related to each of the first web pages in association with each other;

extracting a preference of a user, the extracting of the preference of the user further comprising extracting second words used for an Internet search using a certain client or included in second web pages viewed by the certain client; and accessing the database using the extracted second words, and extracting a second classification word from the database, thereby extracting the second classification word related to each client; and matching third web pages to the user, the matching of the third web pages to the user further comprising obtaining the third web page having a third classification word related to the second classification word using the first classification word and the second classification word; and reading out the access information for the third web page from the stored access information, and displaying the access information read out to the client, wherein the classification words are each one of a tag or a category in a given web page, and wherein the tag is text information displayed on the given web page, and which represents the gist of the word group included in the sentences of the given web page.

8. The method accordance with claim 7, wherein at least one of the first, second, third, or certain classification words is stored as the tag.

* * * * *